United States Patent
Wang et al.

(10) Patent No.: US 12,519,665 B2
(45) Date of Patent: Jan. 6, 2026

(54) METHODS FOR BLOCKCHAIN OFFLINE OPERATIONS MANAGEMENT

(71) Applicant: INTERDIGITAL PATENT HOLDINGS, INC., Wilmington, DE (US)

(72) Inventors: Chonggang Wang, Princeton, NJ (US); Xu Li, Plainsboro, NJ (US); Paul Russell, Lawrence, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 98 days.

(21) Appl. No.: 18/274,258

(22) PCT Filed: Feb. 3, 2022

(86) PCT No.: PCT/US2022/015105
§ 371 (c)(1),
(2) Date: Jul. 26, 2023

(87) PCT Pub. No.: WO2022/169966
PCT Pub. Date: Aug. 11, 2022

(65) Prior Publication Data
US 2024/0089130 A1    Mar. 14, 2024

Related U.S. Application Data

(60) Provisional application No. 63/145,285, filed on Feb. 3, 2021.

(51) Int. Cl.
*G06F 16/901* (2019.01)
*G06F 11/14* (2006.01)
*H04L 9/00* (2022.01)

(52) U.S. Cl.
CPC ........................ *H04L 9/50* (2022.05)

(58) Field of Classification Search
None
See application file for complete search history.

(56) References Cited

U.S. PATENT DOCUMENTS

| 10,642,699 B2 | 5/2020 | Tang |
| 10,742,837 B1 | 8/2020 | Sankarapandian et al. |

(Continued)

FOREIGN PATENT DOCUMENTS

| CN | 108764868 A | * | 11/2018 | ......... G06Q 20/3829 |
| JP | 2009055301 A | | 3/2009 | |

(Continued)

OTHER PUBLICATIONS

European Telecommuncations Standards Institute, "PDL Operations in Offline Mode Release #," ETSI GR PDL 010 V0.0.2 (Nov. 2020).

(Continued)

*Primary Examiner* — Christopher B Robinson
(74) *Attorney, Agent, or Firm* — Volpe Koenig

(57) ABSTRACT

Methods and apparatus for offline management of blockchain nodes are disclosed. A method performed by a first blockchain node may comprise transmitting, to at least a second blockchain node, a first message that includes information indicating a status of the first blockchain node and a value indicating a time at which the first block chain node will go offline; receiving, from the second blockchain node, a second message that includes information indicating a blockchain proxy node being selected for the first blockchain node; and transitioning to an offline status at the time indicated by the value.

15 Claims, 20 Drawing Sheets

(56) References Cited

U.S. PATENT DOCUMENTS

| | | | |
|---|---|---|---|
| 2018/0062831 A1 | 3/2018 | Zhang | |
| 2019/0320014 A1* | 10/2019 | Allen | H04N 21/6405 |
| 2019/0349733 A1* | 11/2019 | Nolan | H04L 45/20 |
| 2020/0167319 A1* | 5/2020 | Fritz | G06F 16/1824 |
| 2024/0098072 A1* | 3/2024 | Verzun | H04L 63/123 |

FOREIGN PATENT DOCUMENTS

| | | |
|---|---|---|
| WO | 2011/109424 | 9/2011 |
| WO | 2015129306 A1 | 9/2015 |

OTHER PUBLICATIONS

European Telecommuncations Standards Institute, "PDL Operations in Offline Mode Release #," ETSI GR PDL 010 V0.0.5 (Nov. 2020).

European Telecommuncations Standards Institute, "Permissioned Distributed Ledger (PDL); Application Scenarios," ETSI GR PDL 003 V1.1.1 (Dec. 2020).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Third Generation Partnership Project, "Technical Specification Group Services and System Aspects; System architecture for the 5G System (5GS); Stage 2 (Release 16)," 3GPP TS 23.501 V16.4.0 (Mar. 2020).

Third Generation Partnership Project, "Technical Specification Group Services and System Aspects; System architecture for the 5G System (5GS); Stage 2 (Release 16)," 3GPP TS 23.501 V16.7.0 (Dec. 2020).

Third Generation Partnership Project, "Technical Specification Group Services and System Aspects; System architecture for the 5G System (5GS); Stage 2 (Release 16)," 3GPP TS 23.501 V16.11.0 (Dec. 2021).

Third Generation Partnership Project, "Technical Specification Group Services and System Aspects; System architecture for the 5G System (5GS); Stage 2 (Release 17)," 3GPP TS 23.501 V17.3.0 (Dec. 2021).

Tian et al., "A Coverage-Preserving Node Scheduling Scheme for Large Wireless Sensor Networks," Proceedings of the First ACM International Workshop on Wireless Sensor Networks and Applications, pp. 32-41 (Sep. 2002).

\* cited by examiner

METHODS FOR BLOCKCHAIN OFFLINE OPERATIONS MANAGEMENT

This application is the U.S. National Stage, under 35 U.S.C. § 371, of International Application No. PCT/US2022/015105 filed Feb. 3, 2022, which claims the benefit of U.S. Provisional Application No. 63/145,285, filed Feb. 3, 2021, the contents of which are incorporated herein by reference.

BACKGROUND

Blockchain technology is a technology, which jointly leverages and builds on top of a few existing techniques such as cryptography, hashing, Merkle tree, distributed ledgers, Peer-to-Peer (P2P) networking, and consensus protocols. But blockchain technology innovatively integrates them together to enable a system that can provide advanced features such as decentralization, immutability, transparency, and security; blockchain system is referred to as the system using blockchain technology. Applications using and/or supported by a blockchain system are referred to as blockchain applications. A blockchain system is underpinned by underlying blockchain networks which are composed of many participating blockchain nodes. Each blockchain node hosts one or more distributed blockchains (a form of distributed ledgers) and participates in the blockchain system.

For example, blockchain nodes broadcast blockchain transactions and blocks among each other using peer-to-peer networking; blockchain nodes also perform consensus protocols with each other to reach distributed trust without relying on a centralized party. A blockchain transaction may be a digital representation of a real-world transaction, a digital record of physical assets, a digital record of a physical event, a digital record of any action in an information system, a digital payment, and/or a digital smart contract; a block groups multiple blockchain transactions together; a blockchain is a data structure to chain a growing number of blocks.

SUMMARY

Methods and apparatus for offline management of blockchain nodes are disclosed. A method performed by a first blockchain node may comprise: transmitting, to at least a second blockchain node, a first message that includes information indicating a value that indicates a time at which the first block chain node will change status to offline; receiving, from a blockchain management function (BMF), a second message that includes information indicating a blockchain proxy node being selected for the first blockchain node; and transitioning to the offline status at the time indicated by the value. The first blockchain node may be a wireless transmit/receive unit (WTRU). The first message may indicate the first blockchain node's preferred proxy node. A blockchain client may indicate the first blockchain node's preferred proxy node. The BMF may select a proxy nodes based on each proxy node's capability. The second message may indicate that the second blockchain node can be a proxy node for the first blockchain node

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
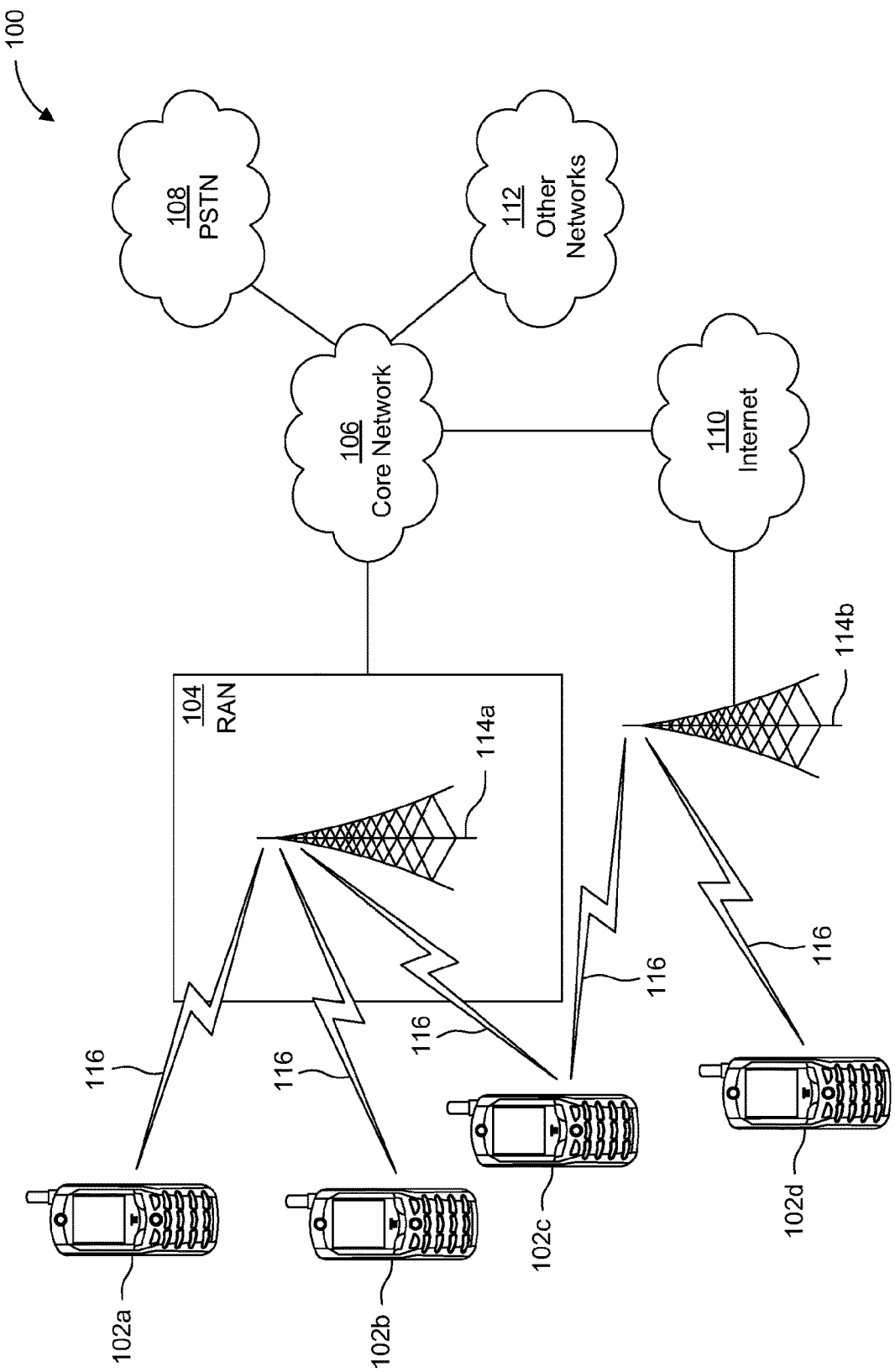
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
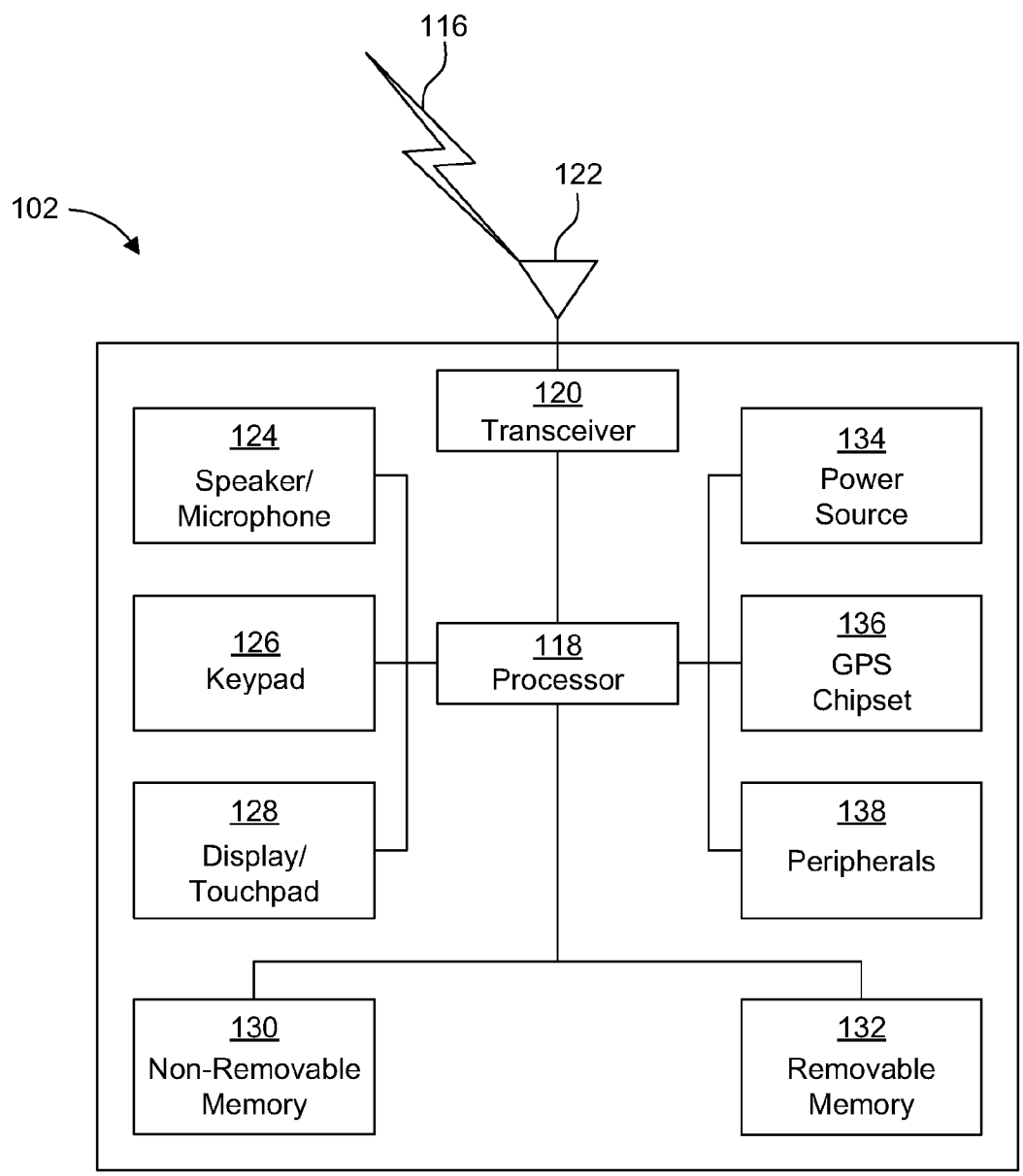
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
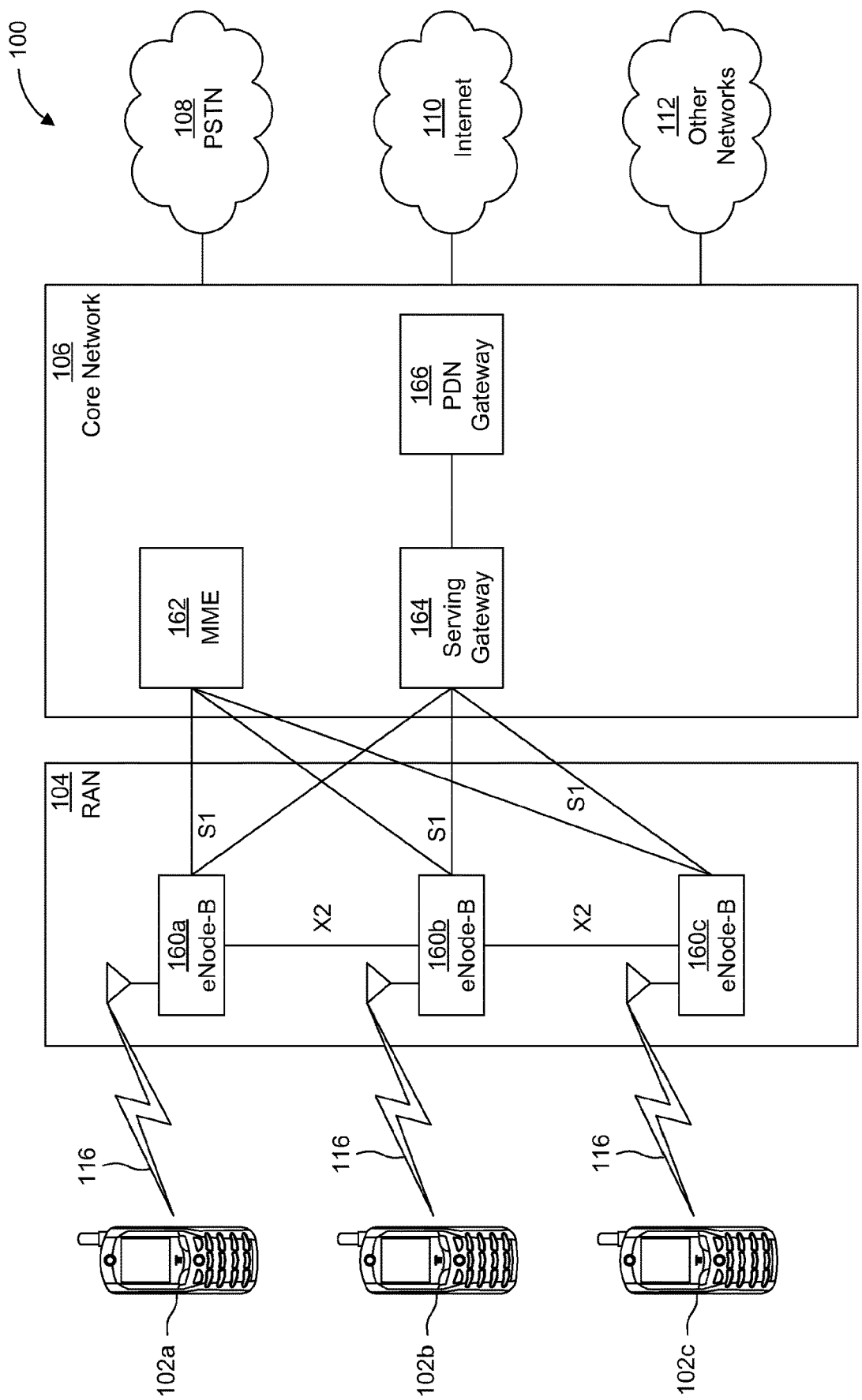
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
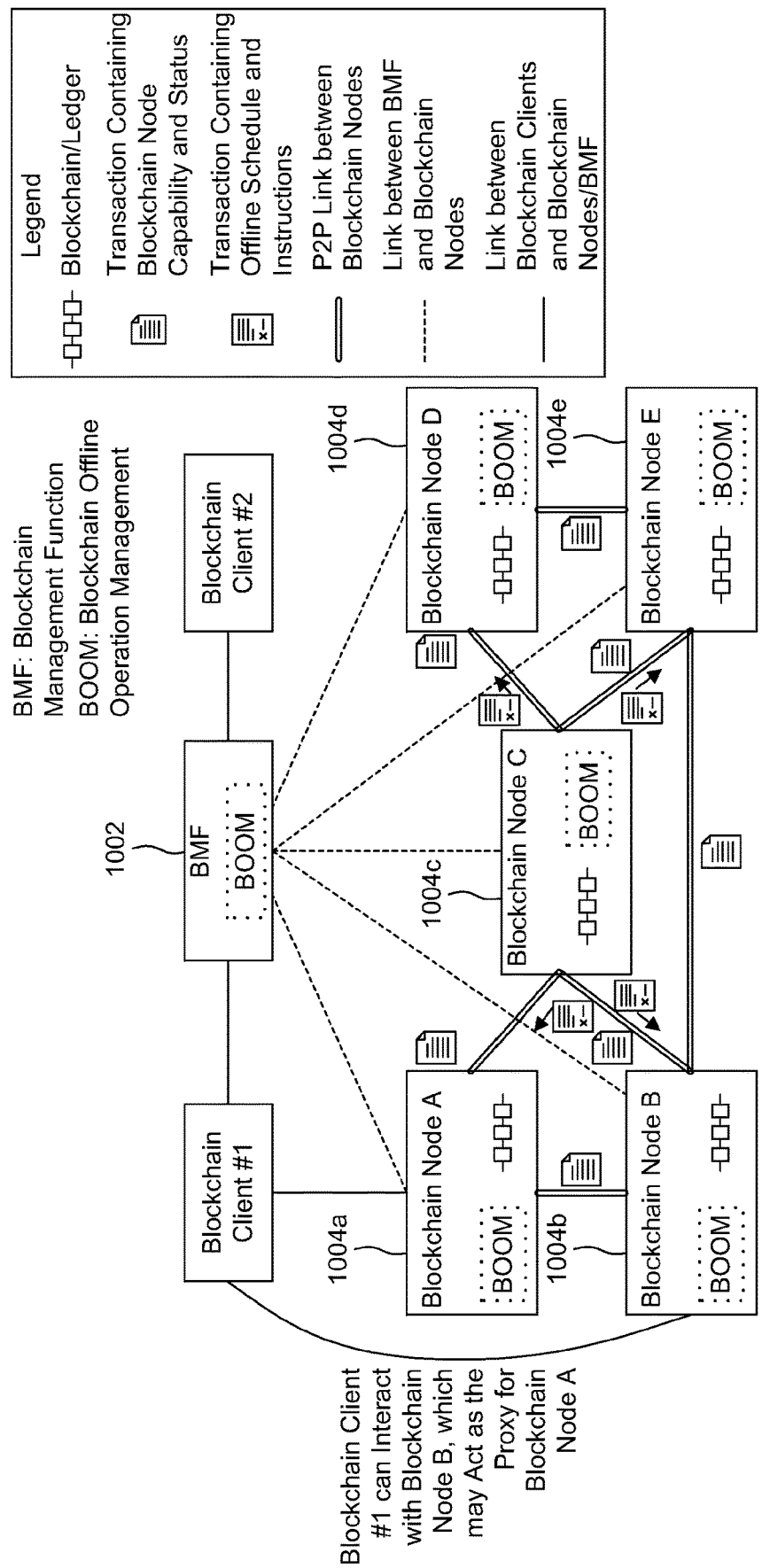
FIG. 10 illustrates an exemplary system overview of on-chain blockchain offline operations management.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
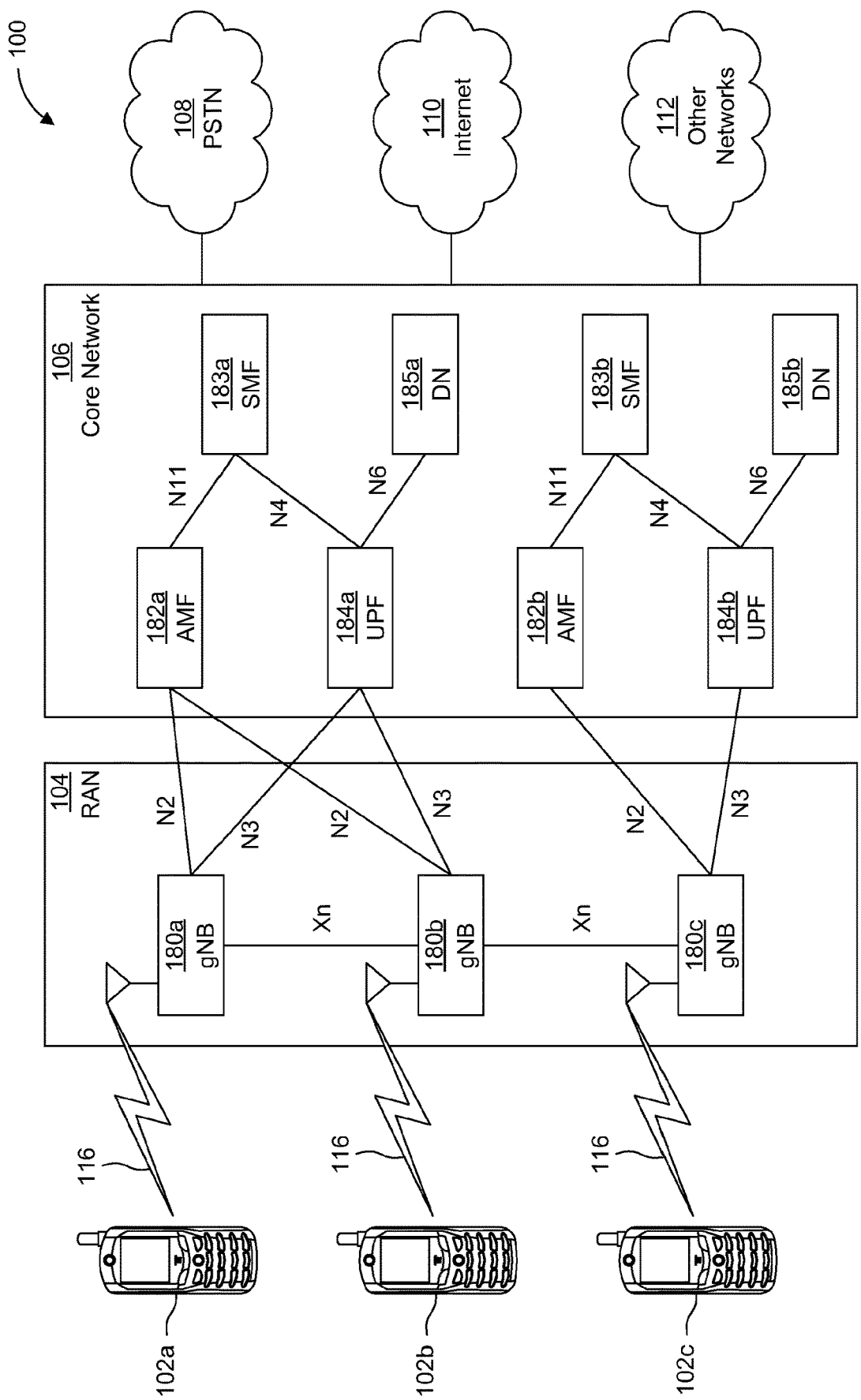
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
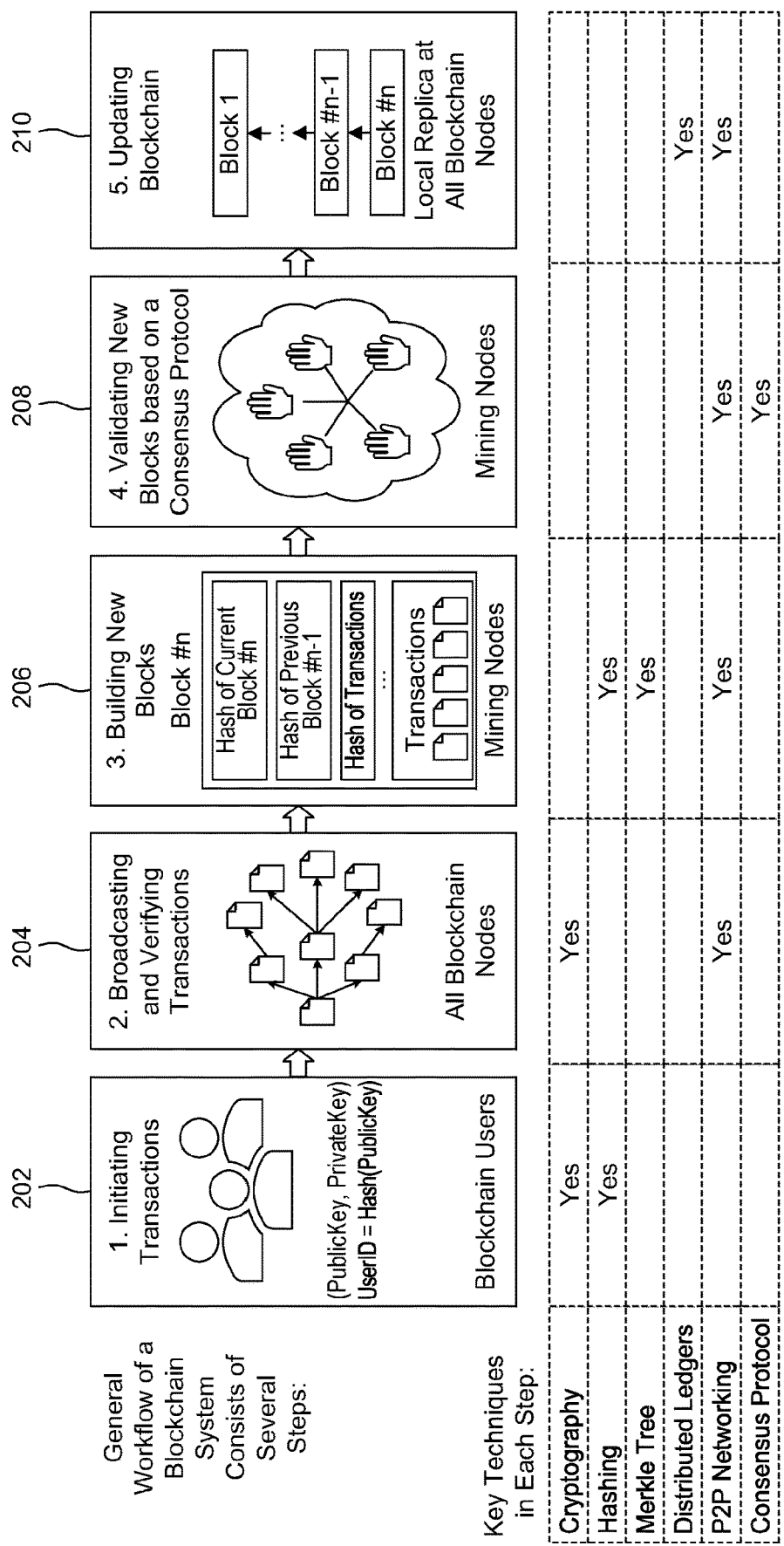
FIG. 2 illustrates an exemplary general workflow of a blockchain system.

FIG. 2 illustrates the general workflow of a blockchain system 200. At 202, each participating user generates new transactions independently. Each user has a user or account identifier, which is in general a hash of the user's public key. Each new transaction may be signed using the user's private key. After a new transaction is generated, the user sends it to the blockchain network.

At 204, a new transaction will be first received by some blockchain nodes, which may verify its integrity using the user's public key, which may be included in the transaction. After the verification, and if the new transaction is valid, it may be relayed and broadcasted within the blockchain network. Eventually, all blockchain nodes may receive and have a copy of any newly generated and valid transactions.

At 206, some blockchain nodes (referred to as "mining nodes" or "full nodes") start to group many newly generated and pending transactions together to generate a new block. The new block may consist of a block header and a block body. The block header generally includes a hash of the current block, a hash of the previously-confirmed block, and a hash of all included transactions (e.g., Merkle tree). Dependent on the consensus protocol, the block header may include additional information. The block body includes the content of all included transactions. Each mining node independently attempts to create a new block.

At 208, mining nodes independently attempt to create a new block. These nodes run the same consensus protocol (e.g., Proof-of-Work in Bitcoin system) and reach an agreement on who (i.e., a winner) may be allowed to insert a block to the existing blockchain. The winner of the consensus protocol may send its newly generated block to the blockchain network. This new block may be broadcasted and let all mining nodes receive it and verify it.

At 210, after the newly generated block is verified, it may be successfully appended to the existing blockchain because it includes a hash of the previous block (i.e., the last block of the previous blockchain).

Figure 3:
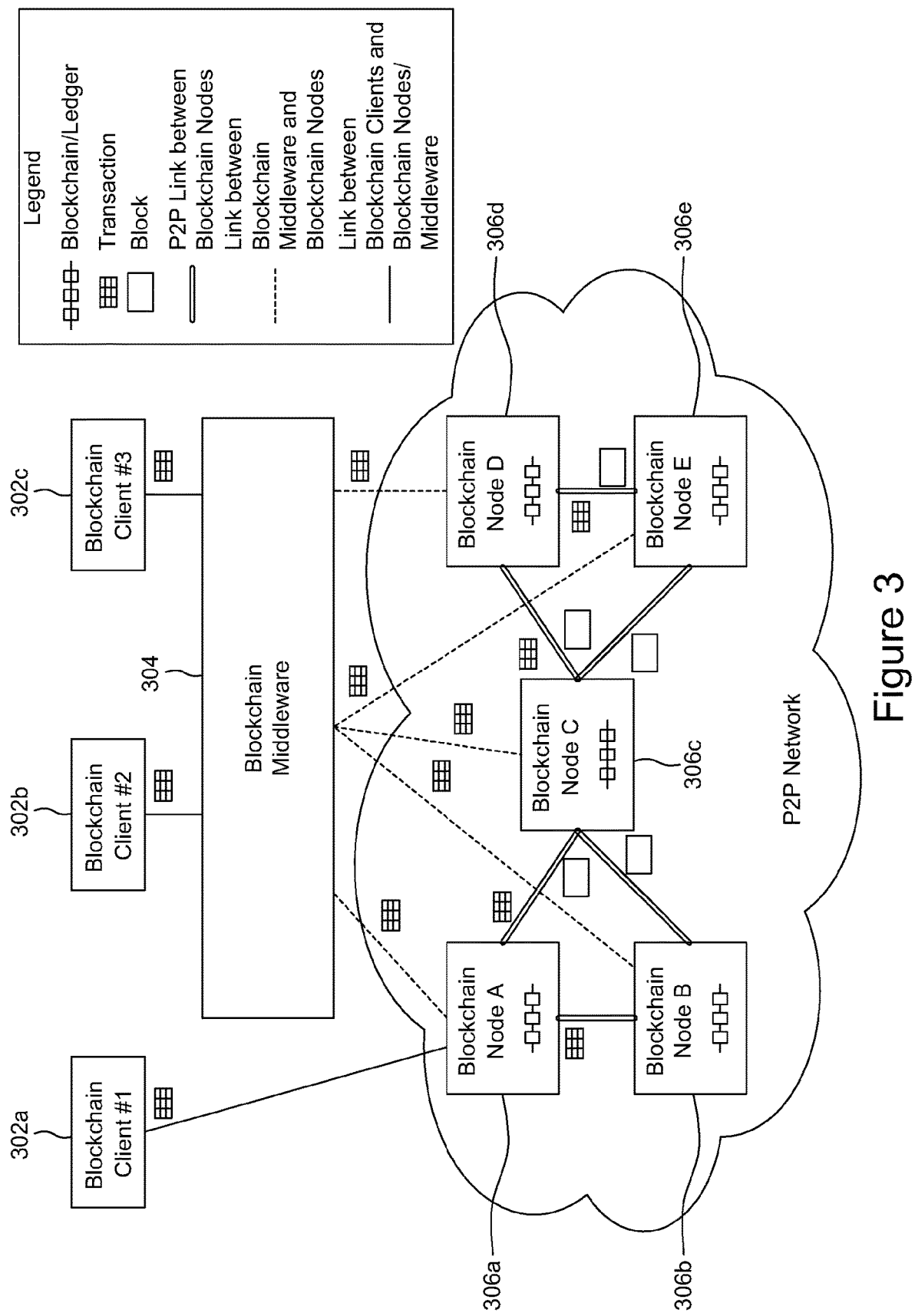
FIG. 3 illustrates an exemplary blockchain system architecture.

FIG. 3 illustrates a general blockchain system architecture, which may consist of several types of logical entities including a management node, some blockchain nodes hosting blockchains or distributed ledgers, and some blockchain clients 302a, 302b, and 302c, such as blockchain applications.

Blockchain Middleware (BCM) 304 bridges blockchain clients 302a, 302b, and 302c and blockchain nodes 306a, 306b, 306c, 306d, and 306e. BCM 304 interacts with blockchain nodes 306a, 306b, 306c, 306d, and 306e on behalf of blockchain clients 302a, 302b, and 302c although a blockchain client may also directly interface with a blockchain node for some occasions. BCM 304 may also manage and coordinate all blockchain nodes 306a, 306b, 306c, 306d, and 306e. For example, a blockchain client 302a, 302b, or 302c simply sends a blockchain transaction to BCM 304 without indicating any blockchain node 306a, 306b, 306c, 306d, or 306e as a destination node. Then, BCM 304 may select a blockchain node 306a, 306b, 306c, 306d, or 306e and forward the blockchain transaction to the selected or an appropriate blockchain node 306a, 306b, 306c, 306d, or 306e. BCM 304 may be regarded as a proxy for blockchain clients 302a, 302b, or 302c to interact with blockchain nodes 306a, 306b, 306c, 306d, or 306e. BCM 304 may optionally maintain the same blockchain/ledger as blockchain nodes host. Public blockchain systems may not have such a BCM 304, but private or permissioned blockchain systems usually have a BCM 304 for blockchain governance, access control, and other management purposes.

Blockchain nodes (BCN) may participate in blockchain workflow and may perform actions as illustrated in FIG. 2. Blockchain nodes may be connected via P2P links and form a mesh P2P network, over which transactions and blocks are broadcast among all blockchain nodes. A blockchain node may connect to multiple other blockchain nodes as its neighbors or neighboring blockchain nodes. For example, blockchain node A 306a has two neighbors (i.e. blockchain node B 306b and blockchain node C 306c). Since blockchain nodes may form a mesh network, the loss of a blockchain node (e.g., going offline) usually will not impact normal operations of the blockchain system. For example, if blockchain node A 306a goes offline, other blockchain nodes 306b, 306c, 306d, or 306e are still connected and may function well. But if the loss of a blockchain node will break the mesh network, such a blockchain node may be referred to as a critical blockchain node. For example, blockchain node C 306c may be a critical blockchain node. A well-designed P2P routing protocol may avoid the existence of any critical blockchain node. A blockchain node may serve multiple blockchain clients. When a blockchain node receives new transactions from its clients, it may broadcast them throughout the P2P network so that they may be received by all other blockchain nodes. Similarly, when a blockchain node wins the consensus protocol, the new blockchain block generated by it may also be broadcast towards all other blockchain nodes.

Each blockchain node hosts one or multiple progressing blockchains. How blockchain nodes are connected to each other is dependent on P2P routing protocols (e.g., gossip-based routing) for the P2P network. A good P2P routing protocol may avoid the existence of any critical blockchain nodes. Blockchain nodes including P2P routing protocols may be managed and coordinated by BCM. Standardization on blockchain operations when there are blockchain nodes in offline mode has recently started. There may be two types of blockchain nodes: (1) basic blockchain nodes that host blockchains including sending/receiving transactions and receiving new blocks, but they do not participate in consensus protocols; or (2) endorsers/validators/miners that not only host blockchains but also participate consensus protocols including generating new blocks.

Blockchain Clients (BCC) may generate new transactions and send them to the corresponding blockchain nodes directly or sends them to BCM to be forwarded to blockchain nodes. A BCC, when interacting with blockchain nodes directly, may interfaces with one blockchain node, which however may be changed. Multiple blockchain clients may connect to the same blockchain node. A blockchain client may lose its connection to a blockchain node or blockchain middleware. As a result, it becomes offline to the entire blockchain system. A blockchain client may be a blockchain application on a device (i.e., local blockchain client) to a blockchain application in the cloud (i.e., remote blockchain client).

Figure 4:
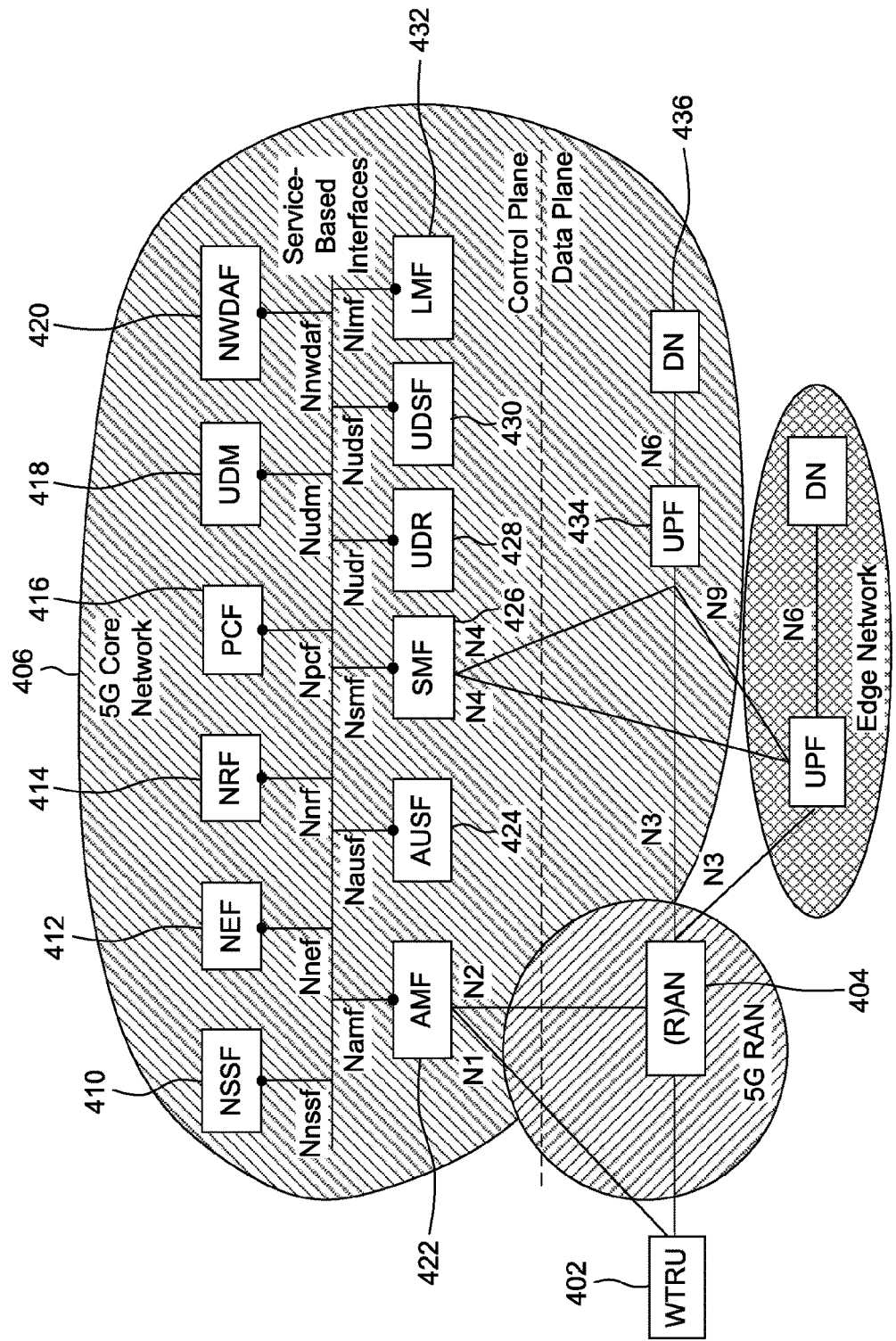
FIG. 4 illustrates an exemplary 5G system architecture.

FIG. 4 illustrates an exemplary 5G system architecture. As shown in FIG. 4, an exemplary 5G system may consist of wireless transmit/receive units (WTRU) 402, Radio Access Network (RAN) 404, and Core Network 406. One of the design principles for 5G system architecture is service-centric or service-based. As shown in FIG. 4, 5G Core Network may include a variety of network functions, which work together to fulfill and provide needed services to the RAN 404, WTRUWTRU 402, and Application Server/Service Provider. A network function may access another network function in request/response mode or subscription/notification mode. Before two network functions interact with each other, they first need to register with Network Repository Function (NRF) 414 so that they may discover each other from NRF 414. Among these network functions, Access and Mobility Management Function (AMF) 422 may be dedicated to managing the WTRU, the WTRU's access to the 5G system, and its mobility. Session Management Function (SMF) 426 may be responsible for establishing sessions between the WTRUWTRU 402 and 5G core network 406. Authentication Server Function (AUSF) 424 takes charge of WTRU 402 authentication. In addition, Policy Control Function (PCF) 416 provides policy rules for other control plane network functions and WTRU 402. PCF 416 assigns an identifier for each created policy rule, which other control plane network functions and WTRU 402 use to refer to the corresponding policy rule. User Plane Function (UPF) 434 may be the only function for the user plane. UPF 434 facilitates to monitor, manage, control and redirect user plane traffic flows such as between the WTRU 402 and an application server.

Network Exposure Function (NEF) 412 enables to explore control plane functions to entities such as network applications which are outside of 5G system and not in the same trusted domain. 5G core network 406 also provides data storage and analytics services through functions like Unified Data Management (UDM) 418, Unified Data Repository (UDR) 428, Unstructured Data Storage Function (UDSF) 430, and Network Data Analytics Function (NWDAF) 420. Another critical feature in 5G system is network slicing, which may be facilitated by Network Slice Selection Function (NSSF) 410. Although these network functions are defined as separate logical entities, a particular scenario may require multiple network functions. For instance, WTRU mobility will need not only AMF 422, but also AUSF 424 and SMF 426. For a type of network function, multiple instances may be instantiated and NRF may maintain the information of each instantiated network function instance. With the emerging of edge computing, some network functions in 5G Core Network such as UPF 434 and NEF 412 may be deployed and resided in an edge network that is much nearer to and potentially co-located with RAN 404.

Figure 5:
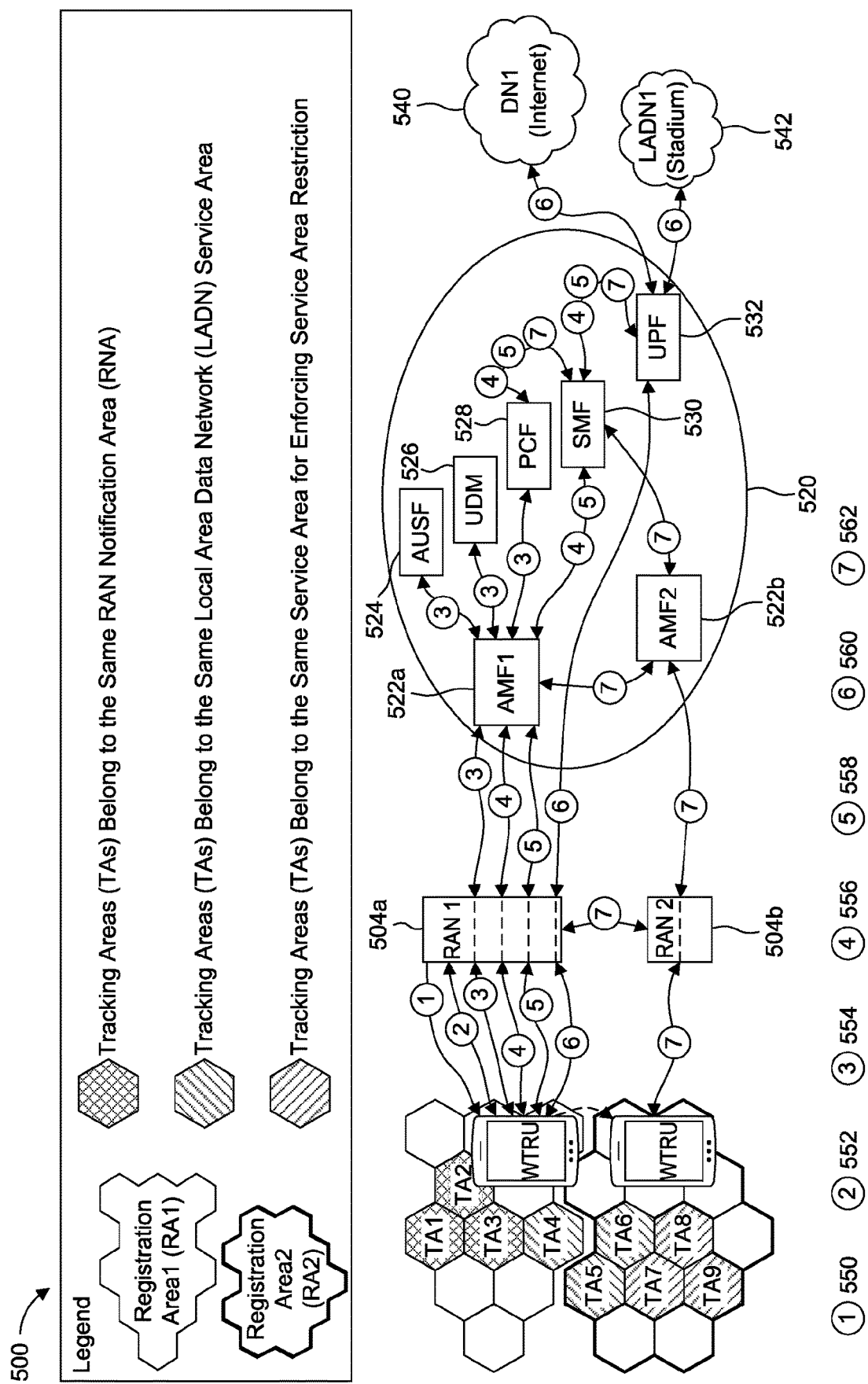
FIG. 5 illustrates exemplary general procedures in a 5G system architecture.

FIG. 5 illustrates some general procedures in 5G system architecture 500, which are jointly performed by a WTRU 502a, RAN nodes 504a and/or 504b, and the 5G core network to enable the WTRU 502a to fulfill the functionalities described below.

At 550, the WTRU 502a may discover and select a network (i.e., a PLMN, a RAN, a cell) based on the received System Information Block (SIB), which RAN nodes 504a and/or 504b broadcast to all WTRUs.

At 552, the WTRU 502a may establish a Radio Resource Control (RRC) connection with the selected RAN (e.g. RAN1 504a), so that the WTRU 502a may communicate with the core network 520 via the selected RAN 504a.

At 554, the WTRU 502a may initiate a registration with a serving AMF 522a, which may be determined by the selected RAN 504a. Here, the serving AMF 522a may check with AUSF 524 for primary access authentication and authorization, request WTRU's subscription data from UDM 526, check with PCF 528 for access and mobility policies, and optionally contact SMF 530 to activate any existing PDU session if WTRU 502a indicates. 5G introduces the concept of Registration Area (RA), which consists of multiple Tracking Areas (TAs). When the WTRU 502a stays within a RA (e.g. RA1), it usually does not need to perform registration update with the serving AMF 522a again to reduce signaling overhead, unless the periodical registration timer gets expired. Each TA may cover multiple cells. When the WTRU 502a moves from one RA to another RA (e.g. RA2), the WTRU 502a needs to perform a new registration with the registration type set to Mobility Registration Update. A larger RA helps to reduce registration overhead, but it may increase the overhead of paging signaling, which the serving AMF 522a uses to page a WTRU 502a.

Next the WTRU 502a may enter to RM-REGISTERED state and may start to interact with other control plane NFs via the serving AMF 522a. The serving AMF 522a may be the only entry point for the WTRU 502a to access and interact with the core network control plane. Service request may be done together with WTRU 502a registration and as a result, the WTRU enters into CM-CONNECTED. When the WTRU 502a stays in CM-CONNECTED state, the WTRU 502a may move within the RA without notifying the serving AMF 522a. But if WTRU moves out of a RAN Notification Area (RNA) yet still within the RA, the WTRU 502a may need to perform a RAN update to trigger the RAN to update the WTRU 502a context and the corresponding RRC connection maintained by the RAN. Note that an RNA may be a subset of a RA; for example, TA1, TA2, and TA3 forms an RNA.

At 556 the WTRU 502a may establish a PDU session for a designated DN with an SMF 530, which may be determined by the serving AMF 522s. The SMF 530 may check with a PCF 528 for PDU session policies and may select a UPF 532 as the PDU Session Anchor (PSA). The PSA may be the entry point for the WTRU 502a to access a Data Network (DN) 540 or receive packets from a DN 540. When the SMF 530 checks with the PCF 528 for session policies, the PCF 528 may retrieve WTRU's 502a subscription data from a UDR. The SMF 530 may perform primary session authentication using the WTRU's 502a subscription data as retrieved from a UDM, and optionally perform secondary authentication between the WTRU 502a and a DN-AAA server using the Extensible Authentication Protocol (EAP) as defined in RFC3748 and RFC5247. This may be jointly performed with the procedures described at 558.

When the WTRU 502a enters to CM-IDLE state (e.g. after the WTRU's 502a connection with the serving AMF is released), the WTRU 502a may (e.g. in Mobile Initiated Connections Only (MICO) mode) actively initiate service request procedure to reestablish a connection with the serving AMF 522a and enters to CM-CONNECTED state. If the WTRU is not in MICO mode while in CM-IDLE state, the serving AMF 522a may page and trigger the WTRU 502a to initiate service request procedure, for example, to receive any downlink packets. As a result of the service request, a Non-Access-Stratum (NAS) connection may be established between the WTRU 502a and its serving AMF 522a.

When the WTRU starts data plane data transmission with the designated DN via RAN 504a and the UPF 532 as PSA. Each DN may have a Data Network Name (DNN).

When the WTRU 502a moves from RA1 to RA2, it may detect this event by checking the list of TAs for each RA as configured by the serving AMF. Then, the WTRU 502a performs a Mobile Registration Update with a new serving AMF. Xn-based or N2-based inter-RAN handover may be performed between the new RAN and the old RAN. The new serving AMF contacts the old serving AMF for transferring WTRU's 502a context information. The SMF may contact PCF and UPF to update existing PDU sessions with the WTRU 502a.

As shown in FIG. 5, multiple TAs may be grouped together as a Local Area Data Network (LADN) service area to support LADN service. As an example, TA4, TA5, and TA6 forms a LADN service area. As such, the WTRU may be allowed to access LADN1 if and only if the WTRU 502a stays within TA4, TA5, or TA6. Similarly, a set of TAs may be grouped as a service area, based on which 5GS may specify and enforce service area restrictions for a WTRU 502a. For example, TA7, TA8, and TA9 forms a service area, which 5GS may configure it with a WTRU 502a for service area restriction. As such, the WTRU may be allowed to access 5GS if and only if the WTRU 502a stays with TA7, TA8, or TA9.

FIG. 5 represents one example. The WTRU 502a may perform the procedure in a different order. The procedure described at 560 may occur in the data plane and all other procedures may occur in the control plane.

Figure 6:
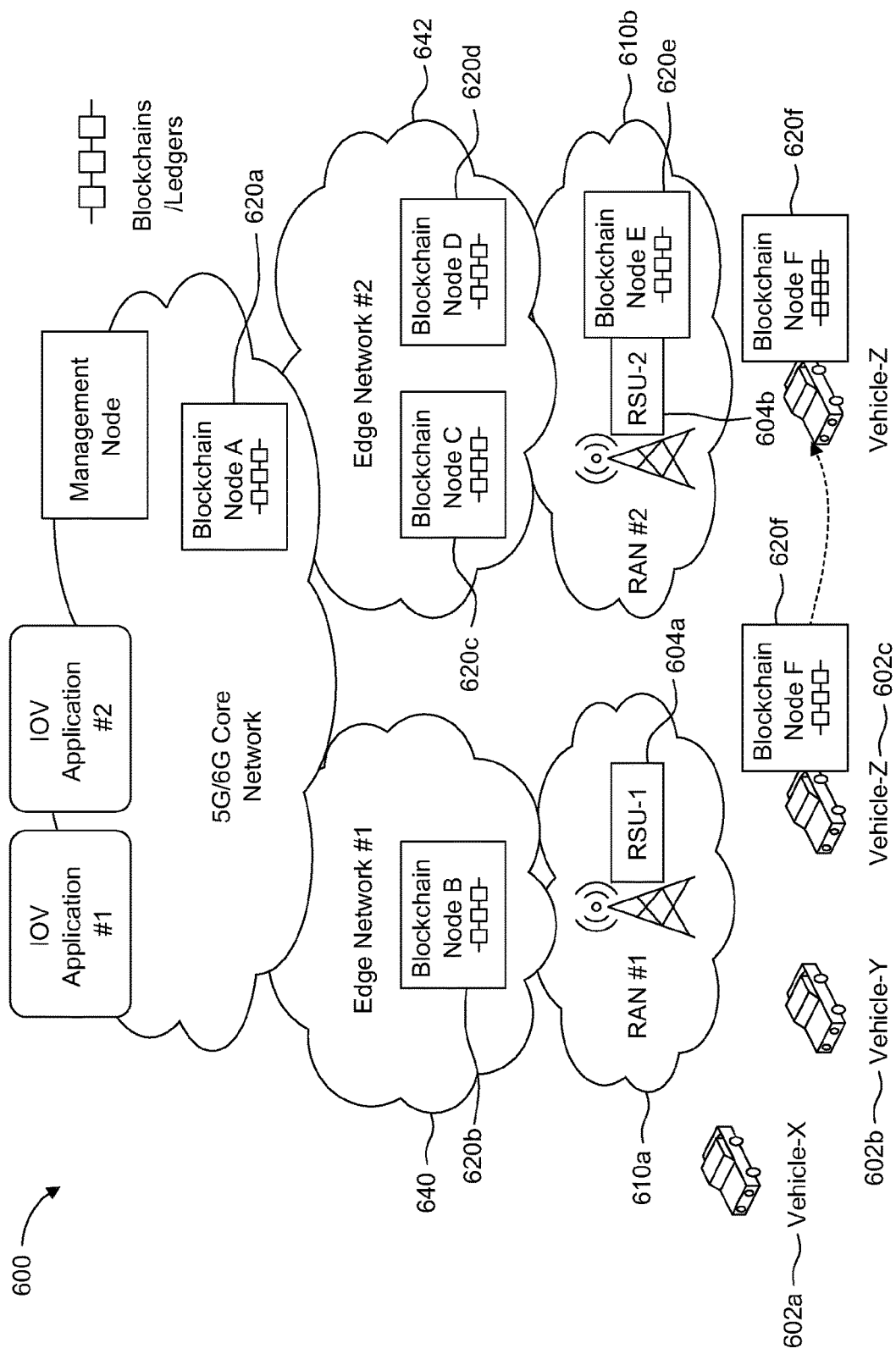
FIG. 6 illustrates an exemplary use case for the Internet of Vehicles (IoV) based on blockchain technology.

FIG. 6 illustrates a use case for the Internet of Vehicles (IoV) based on blockchain technology. Each vehicle 602a, 602b, and/or 602c may have at least a wireless connection (e.g., 5G and/or 6G), which connects the vehicle via a Roadside Unit (RSU) 604a and/or 604b (or a base station) to the Internet. The RSU 604a and 604b may have a local edge network with computing and storage resources. Vehicle 602a, 602b, and 602c may move from one RSU to another RSU. Vehicle 602a, 602b, and 602c may communicate with each other or another vehicle, a RSU, an edge network, a core network, and/or an application server. In this use case, blockchain nodes may be deployed in 5G/6G core network, edge networks, Radio Access Networks (RANs), and even in vehicles. For example, vehicle 602c may host a blockchain. Blockchain nodes 620b, 620c, and 620d in the edge network may be co-located with edge servers, while blockchain nodes 610e in radio access networks may be co-located with RSUs.

In one exemplary use case, a blockchain node may lose connectivity completely and as such it cannot talk to any other blockchain nodes. As such, this blockchain node may be regarded as an offline blockchain node from a blockchain system perspective. For example, when vehicle 602c moves from RAN1 610a to RAN2 610b, it may lose the communication link to both RAN1 610a and RAN2 610b. As a result, blockchain node 620f on vehicle 602c cannot be reached by other blockchain nodes and it becomes an offline blockchain node.

In this exemplary use case, a blockchain node may get congested and become unreachable (i.e., offline). For example, blockchain node B 620b in edge network #1 640 may serve too many vehicles from RAN #1 610a and applications from 5G/6G core network or the cloud. As a result, its computation power and storage may be used up. To mitigate or solve this issue, blockchain node B 620b may implement offline schedules (either one-time or periodical) and go offline periodically. Such offline schedules may also help blockchain node B 620b to save its energy efficiency.

Blockchain nodes may go offline due to the loss of communication connectivity or blockchain nodes may take turns to go offline for load balance and/or other performance consideration. After a blockchain node goes offline for a time duration, it may wake up and becomes online. In other words, the blockchain node has offline schedules between the online state and offline state. Blockchain node offline management refers to issues such as, but not limited to: (1) to detect offline blockchain nodes; (2) to decide when and which blockchain nodes go offline; (3) to determine how long a selected blockchain node stay online; (4) to determine if the blockchain node going offline needs a proxy node (e.g. another blockchain node); and (5) to decide that when a blockchain node wakes up and back online, how it may synchronize itself with the normal blockchain. Two methods are proposed for Blockchain Offline Operation Management (BOOM). The terms BOOM, offline management, and offline operations management may be used interchangeably, unless there is an explicit clarification.

In Off-Chain BOOM, the coordination and management of blockchain node offline operations may be performed without using any blockchain system mechanisms. A proposed Blockchain Management Function (BMF) may take charge of blockchain node offline schedule management. the BMF may be centralized and out-of-band approach. Also, each blockchain node may have BOOM as a logical function to take care of offline operation management including offline schedule management at the blockchain node side. The coordination and management commands/messaging between blockchain nodes and the BMF may not rely on the blockchain system in the sense that those commands/messaging are issued as general messages (not blockchain transactions) to be exchanged between blockchain nodes and the BMF.

In On-Chain BOOM, the coordination and management of blockchain node offline operations may be performed through normal blockchain operations (e.g., by creating a new blockchain different than the normal blockchain or simply leveraging the normal blockchain). Each blockchain node may also have BOOM as a logic function. This may be a decentralized and in-band approach since the coordination and management commands/messaging may be issued as a type of blockchain transaction and may be broadcast, notified, verified, and agreed among all blockchain nodes (via normal blockchain operations).

As a part of blockchain node offline operations management, methods for blockchain synchronization and offline blockchain node detection are proposed. Offline Blockchain Node may be used to refer to a blockchain node that is currently offline with an offline level.

Online Blockchain Node may be used to refer to a blockchain node that is currently online and performs regularly and normally to support all blockchain-related functions and/or operations.

Offline Blockchain Client may be used to refer to a blockchain client that is currently offline with an offline level.

Online Blockchain Client may be used to refer to a blockchain client that is currently online and performs regularly and normally to support all blockchain-related functions and/or operations.

Offline Level may be used to refer to various levels or options or possibilities or modes of the offline status of an offline blockchain node (or an offline blockchain client) such as, but not limited to, the following:

Offline Level-1 may be used to refer to an offline blockchain node that stay in offline level-1. It may be still able to perform all functions supporting and maintaining the normal blockchain, but it may only reach part of the online blockchain nodes. This blockchain node and a few other offline level-1 and/or online blockchain nodes may communicate with each other and forms a separate or isolated P2P network to generate a separate blockchain, different than the original normal blockchain.

Offline Level-2 may be used to refer to a blockchain node stays in offline level-2. It may be still able to perform all functions supporting and maintaining the normal blockchain, but it cannot reach any of other online blockchain nodes. In other words, this blockchain node itself becomes totally isolated in the blockchain network although it still may be reached by the BMF and/or other network entities.

Offline Level-3: may be used to refer to an offline blockchain node that stays in offline level-3. It cannot perform functions for supporting and maintaining the normal blockchain, but it may still have communication connectivity; as such, it may interact with or be reached by the BMF and/or other network entities for control and management purposes such as offline schedule management.

Offline Level-4 may be used to refer to an offline blockchain node stays in offline level-4. It cannot perform functions for supporting and maintaining the normal blockchain. Also, its communication physical layer enters power-saving modes (e.g., Discontinuous Reception (DRX) and Connected Mode DRX (cDRX) in 4G/5G). In other words, an offline blockchain node in offline level-4 cannot be reached by the BMF, but it may be woken up by some network entities (e.g., base stations in 4G/5G or Wi-Fi access points), which are usually dependent on the underlying communication infrastructure.

Offline Level-5 may be used to refer to an offline blockchain node stays in offline level-5. It is totally offline (e.g., powered off); in other words, it cannot perform functions for supporting and maintaining the normal blockchain, nor reachable by any network entities. It may only be reached when it wakes up next time.

Offline Starting Time may be used to refer to the time when a blockchain node (or a blockchain client) starts to go offline.

Offline Duration may be used to refer to the time duration between when a blockchain node (or a blockchain client) goes offline and when it wakes up next time.

Online Duration may be used to refer to the time duration between when a blockchain node (or a blockchain client) wakes up and when it goes offline again next time.

Offline Repetition may indicate whether a blockchain node (or a blockchain client) go offline one-time or repeatedly. If the blockchain node needs to go offline repeatedly, "Offline Duration" and "Online Duration" indicate how long the blockchain node go offline and stay online in turn.

Offline Schedule may be used to refer to the time schedules for a blockchain node (or a blockchain client) to stay offline and online alternatively including offline level, offline starting time, offline duration, online starting time, online duration, offline repetition, etc. An offline schedule may be applied to a blockchain client as well. For example, an offline schedule may look like (Offline Level="Level-1", Offline Starting Time="t1"; Offline Duration=600 seconds; Offline Repetition="Once"), which indicates that a blockchain node (or a blockchain client) with this offline schedule needs to go offline once at t1 with offline level-1 for 600 seconds. In another example, an offline schedule may look like (Offline Level="Level-4", Offline Starting Time="t2"; Offline Duration=300 seconds; Online Duration=3600 seconds; Offline Repetition="PERIORIDCAL"), which indicates that a blockchain node (or a blockchain client) with this offline schedule starts to go offline and wake up alternatively at t2 with 300 seconds for offline duration at offline level-2 and 3600 seconds for online duration.

Blockchain Node may be used to refer to the logical nodes that host blockchains (or ledgers). A blockchain node may also have functions for endorsing/validating transactions/blocks. In this case, the blockchain node may also be a blockchain endorser and/or a blockchain validator.

Normal Blockchain may be used to refer to the main/primary blockchain and/or corresponding side chains that all blockchain nodes are hosted and support for one or multiple blockchain applications.

Blockchain Synchronization may be used to refer to the process that, when a previously offline blockchain node wakes up or comes online, it needs to retrieve missing transactions/blocks during its offline duration, in order to construct an up-to-date normal blockchain.

Although blockchain may be a type of distributed ledgers, all proposed methods are not dependent on or unique to any particular type of distributed ledgers. Thus, all proposed methods are applicable to blockchain systems and more general distributed ledger systems.

Figure 7:
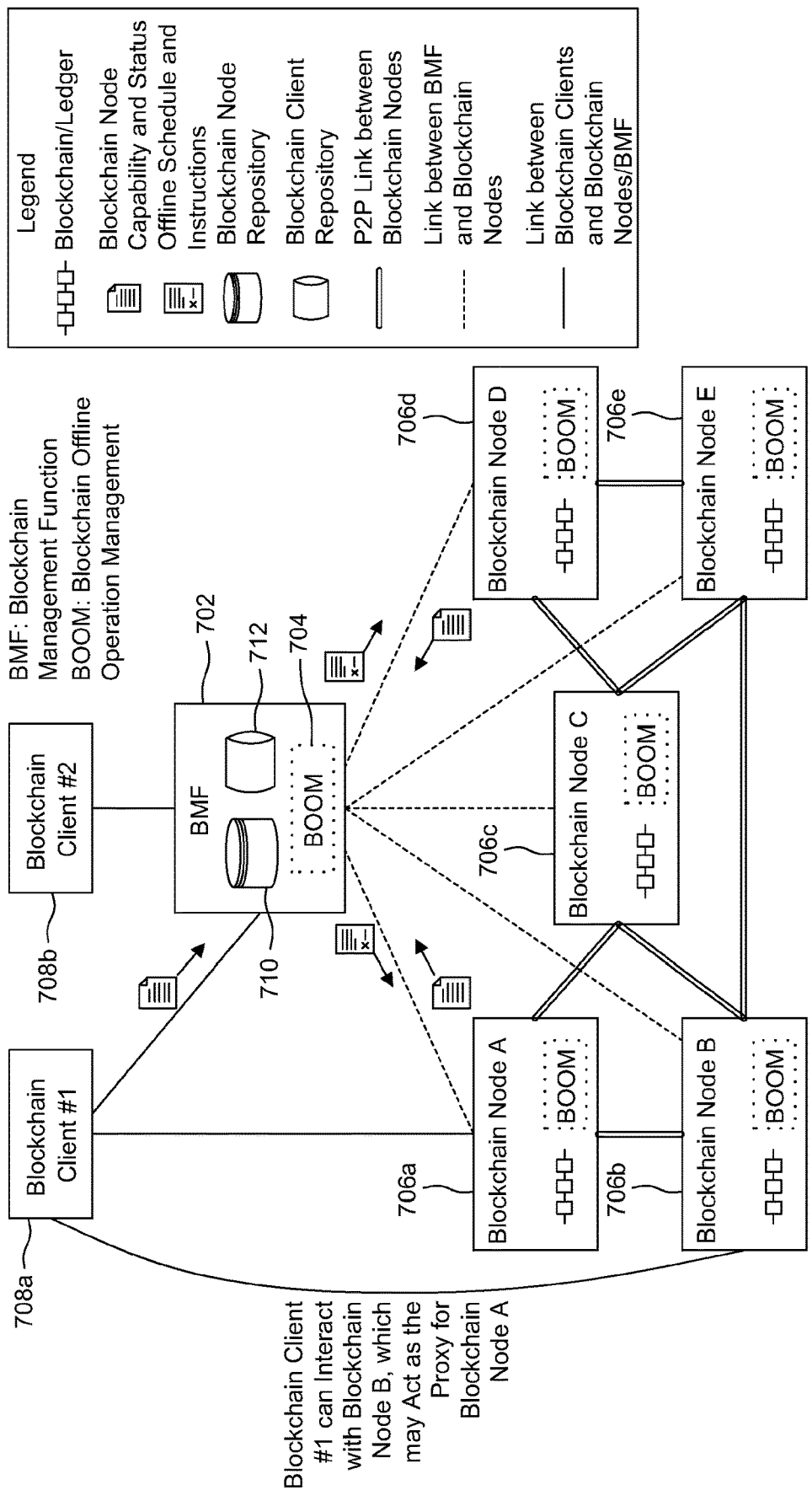
FIG. 7 illustrates an exemplary system overview of off-chain blockchain offline operations management.

In off-chain BOOM, as illustrated in FIG. 7, the BMF 702 may act as a centralized node, which hosts a repository to collect and maintain the status and blockchain capability of all blockchain nodes, referred to as blockchain node repository. the BMF 702 also hosts another repository to collect and maintain requirements and context information of blockchain client, referred to as blockchain client repository. the BMF 702 may also have BOOM 704 as a logical function to manage offline schedules and/or offline operations of blockchain nodes. A blockchain node (e.g., blockchain node A 706*a* and blockchain node D 706*d* as examples in FIG. 7) may actively and periodically report its status and blockchain capability to the BMF 702.

Alternatively, a blockchain node may report its status and blockchain capability only when solicited by the BMF 702. A blockchain node may also report the status and blockchain capability of its neighboring blockchain node on the P2P network to the BMF 702. Here, the blockchain capability may be a joint parameter that is based on multiple variables such as the residual storage, the available computing power, the available communication capacity, the reliability of communication connectivity, the statistics of recently generated normal blocks, the security threat, the supported and/or used consensus protocols, the support of blockchain interoperability, the support of smart contracts, the support of side chains, etc. The status of a blockchain node may be online and various offline levels (e.g., offline level-1, offline level-2, offline-level-3, offline level-4, offline-level-5). In addition, blockchain clients 708*a* and 708*b* (e.g., blockchain Client #1 in FIG. 7), when they interact with blockchain node directly, may monitor the performance of a blockchain node and report it to the BMF 702/BOOM 704.

A blockchain client (e.g., blockchain client #1 708*a* as an example in FIG. 7) may actively and periodically report its requirement and context information to the BMF 702. Alternatively, a blockchain client 708*a* and/or 708*b* may report its requirement and context information only when solicited by the BMF 702. Here, the requirement and context information of a blockchain client may be a joint parameter that is based on multiple variables such as offline schedules, the rate of issuing new transactions, the rate of accessing the normal blockchain, the delay requirement on accessing the normal blockchain, the location, the reliability of communication connectivity, etc.

For example, blockchain clients 708*a* and/or 708*b* may be a blockchain application on a constrained device, which has certain offline schedules to conserve energy consumption and extend device lifetime. As a result, this blockchain client may generate a message to a blockchain node or a the BMF 702 periodically according to its offline schedules. the BMF 702 may make offline schedules of this blockchain client and corresponding blockchain nodes aligned with each other, so that when this blockchain client is online, there is always an online blockchain node available. The requirements and context information of blockchain client are stored in the blockchain client repository in the BMF 702.

Then, the BMF 702 may analyze the information stored in the blockchain client repository 712 and blockchain node repository 710 to determine the next blockchain node(s) for going offline. the BMF 702 may adopt various strategies for selecting blockchain nodes to be offline. For example, it may simply choose each blockchain node in a round-robin way.

In a greedy approach, the BMF may always pick the blockchain node with the least blockchain capability to stay offline for a time duration. Since some blockchain clients may have their own offline schedules, the BMF may select the corresponding blockchain nodes (serving those clients) for going offline with similar offline schedules of these blockchain clients.

When a blockchain node is selected to go offline, the BMF 702 may send some offline schedule and instructions to the blockchain node, which may include the assigned offline level, the assigned offline duration, the assigned proxy node for the blockchain node, and/or how to synchronize with a blockchain node hosting update-to-date normal blockchain when the blockchain node comes online next time, etc.

After staying in the assigned offline level for a designated offline duration, the blockchain node wakes up as a working blockchain node as it is supposed to be. After the blockchain node wakes up, it may contact its proxy node and/or its prior neighboring blockchain nodes to download blocks and transactions it has missed when it was offline. The blockchain node may first contact multiple neighbors to figure out the longest branch of the up-to-date normal blockchain and synchronize itself with the longest branch.

For example, blockchain node A 706a has two neighbors (i.e., blockchain node B 706b and blockchain node C 706c); either blockchain node B 706b or blockchain C 706c may be selected as the proxy for the blockchain node by the BMF 702. When a blockchain node stays offline, its clients may interact with its proxy or other blockchain nodes, which may be coordinated by the blockchain node and/or the BMF. For example, if blockchain node B 706b is selected as the proxy for blockchain node A 706a, blockchain client #1 708a may be informed of the address of blockchain node B 706b and may interact with blockchain node B 706b when blockchain node A 706a goes offline.

The BMF/BOOM may be a logical function entity that may perform the following functions: (1) connect requirement and context information of blockchain clients and maintain them in the blockchain client repository; (2) connect blockchain capability and status of blockchain nodes and maintains them in the blockchain node repository, such as their existing blockchain offline schedules; (3) analyze the information stored in the blockchain node repository and generate instructions of blockchain offline operations or offline schedules for blockchain nodes; (4) send the generated instructions of blockchain offline operations or offline schedules to corresponding blockchain nodes; and (5) when an offline blockchain node wakes up, facilitate it to synchronize itself with the normal blockchain.

Furthermore, BOOM in a blockchain node may be a logical function entity that may perform the following functions: (1) report its blockchain capability and status to the BM F/BOOM; (2) detect the blockchain capability and status of its neighboring blockchain nodes and report them to the BMF/BOOM; (3) receive the instructions of blockchain offline operations or offline schedules from the BMF/BOOM; (4) when an offline blockchain node becomes online, its BOOM receives synchronization assistance from the BMF/BOOM; (5) acts as a proxy node for other offline blockchain nodes and serves their blockchain clients; and/or (6) when an offline blockchain node becomes online, its BOOM downloads missing transactions/blocks from the BM F/BOOM and/or BOOMs of other blockchain nodes.

BOOM in the BMF behaves likes a logical BOOM server role, while BOOM in blockchain nodes acts as a logic BOOM client role. The terms the BMF and the BMF/BOOM are used interchangeably unless there is an explicit clarification. Likewise, a blockchain node by default has a BOOM unless an explicit clarification is made. The proposed BOOM functions in this invention include both BOOM in the BMF and BOOM in blockchain nodes.

The above approach is referred to as active off-chain BOOM since the BMF/BOOM actively decides offline schedules for blockchain nodes (or blockchain clients). In contrast, a passive off-chain BOOM approach is proposed too, where the BMF/BOOM does not decide offline schedules for blockchain nodes (or blockchain clients). Instead, blockchain nodes may have their own offline schedules and they inform the BMF/BOOM of their schedules and may also send the BMF/BOOM a notification whenever it goes offline. Then the BMF/BOOM may select and assign a proxy for the offline node or wake up other offline nodes as a remedy to maintain blockchain system performance.

As an extension, the proposed BMF/BOOM may be defined as a logical role/function (instead of acting as a centralized physical node), i.e. the BMF/BOOM may be acted by different physical nodes. For example, different blockchain nodes may be regarded as physical nodes, and among those nodes, they may vote and select one node to be the one to have the BMF/BOOM and conducting the proposed BMF/BOOM function as mentioned earlier. For example, the physical nodes may conduct certain voting or consensus protocol in order to determine which physical blockchain node is acting as a the BMF/BOOM node during a certain time interval.

After such a node is decided, all the blockchain nodes may be informed. Such a the BMF node selection process may be re-conducted or be triggered periodically. In addition, when the proposed BOOM makes any offline decision for the blockchain nodes (or blockchain clients), the decision may be made in a system-wide way. For example, instead of deciding whether a specific blockchain node should go offline or not, the BMF/BOOM may make a global decision for a list of or a group of blockchain nodes. Or when deciding whether a specific blockchain node should go offline or not, the BMF/BOOM may consider its previous decisions made to other blockchain nodes.

As an example, the BMF may be implemented as part of the Platform Service Layer of Permissioned Distributed Ledger (PDL) reference architecture. BOOM in a blockchain node may be implemented as a part of a PDL node in PDL reference architecture. Alternatively, the proposed BMF/BOOM may also be regarded as a new function or an new value-added service of the blockchain middleware as described in FIG. 2.

Figure 8:
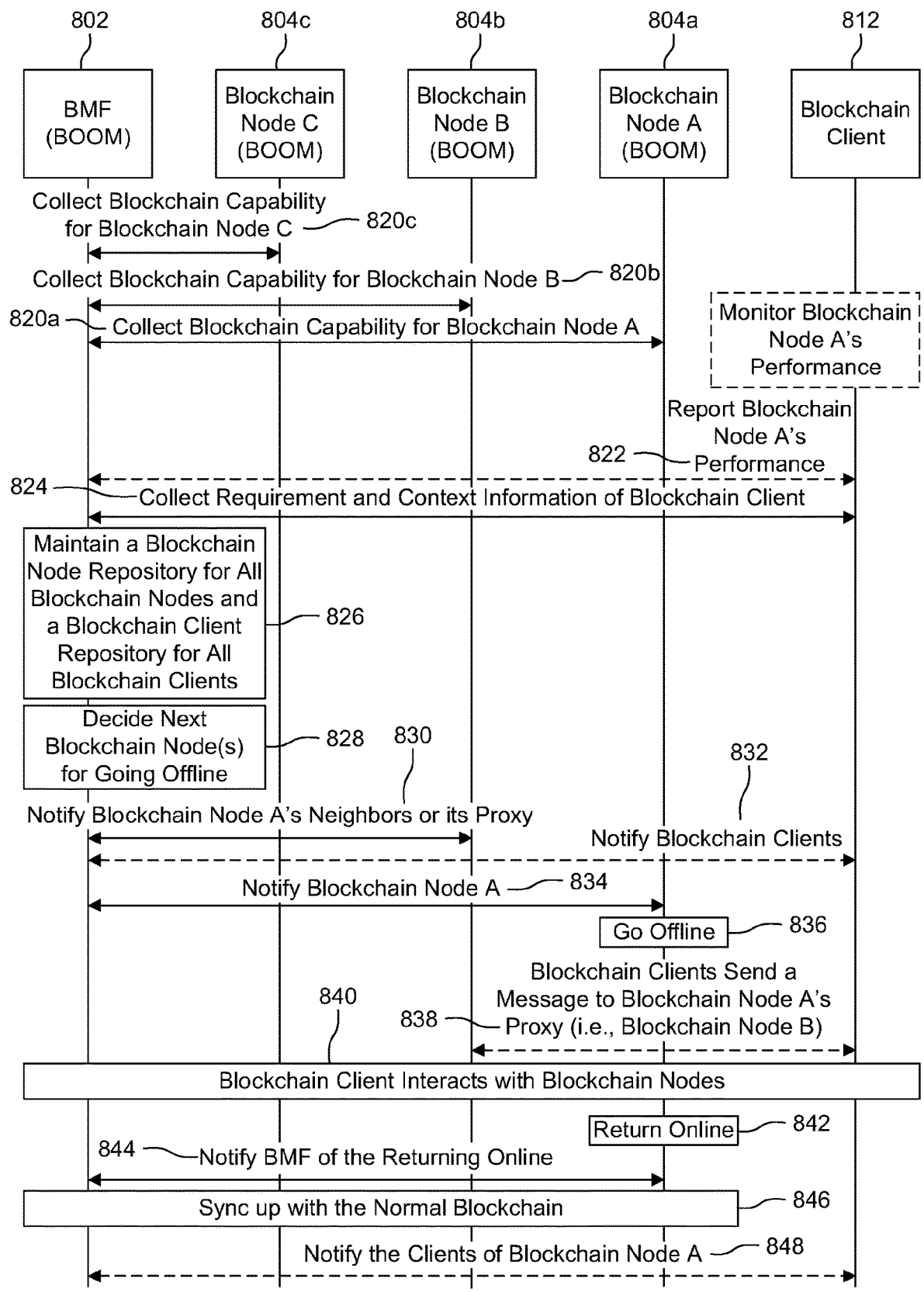
FIG. 8 illustrates exemplary procedures for active off-chain blockchain offline operations management.

FIG. 8 illustrates an active off-chain BOOM 802. At 820a, 820b, and 820c, the BMF 802 collects the blockchain capability and status of all blockchain nodes 804a, 804b, and 804c and maintains them in the blockchain node repository. Each blockchain node 804a, 804b, and 804c may have been configured with the address of the BMF 802. If a blockchain node manages a side-chain system consisting of side-chain nodes, the blockchain node may report the capability and/or status of one or multiple side-chain nodes to the BMF. A blockchain node (i.e., 804a, 804b, and 804c) may report or indicate its preferred proxy nodes to the BMF 802. A blockchain node (i.e., 804a, 804b, and 804c) may also report or indicate a list of blockchain nodes that it may act as a proxy node for. One or multiple following methods may be used:

In the one method, at 820a, 820b, and/or 820c, the BMF 802 may send a blockchain capability and status solicitation request to a blockchain node 804a, 804b, and/or 804c. Then, the blockchain node 804a, 804b, and/or 804c may send a blockchain capability and status solicitation response to the BMF 802. The solicitation request may include the identifier/address of the blockchain node, a flag indicating that the blockchain node also needs to report the status of its neighbors, one or multiple blockchain capability variables indicating that the blockchain node only needs to include the value of these variables, the response time indicating that the blockchain node needs to send back the solicitation response before this response time, etc. The solicitation response may include the identifier/address of the blockchain node, the value of blockchain capability variables as requested, the offline willingness indicating if the blockchain node is willing to go offline, the offline schedule that was assigned by the BMF 802 previously and is currently operated by this node, the offline schedule that the blockchain node has for its own, the affordable offline duration indicating how long the blockchain node may afford to be offline (e.g., a blockchain node supporting many active applications may not be able to stay offline for a long time), the offline starting time indicating when the blockchain node 804a, 804b, and/or 804c is willing to start to go offline, the status and blockchain capability of its neighbors including the identifier/address of the neighbors.

In another method, the BMF 802 may first send a blockchain capability and status subscription request to the blockchain node 804a, 804b, and/or 804c. The blockchain node 804a, 804b, and/or 804c may first send a blockchain capability and status subscription response to the BMF 802. After that, the blockchain node 804a, 804b, and/or 804c may send a blockchain capability and status notification to the BMF 802 whenever its blockchain capability and/or status has a change and meets the notification criteria as included in the blockchain capability and status subscription request. The blockchain capability and status notification may include the same information of the blockchain capability and status solicitation response in the first method.

In yet another method, the BMF 802 may first configure a blockchain capability and status reporting period to each blockchain node 804a, 804b, and/or 804c. The blockchain node 804a, 804b, and/or 804c may periodically send a blockchain capability and status report message to the BMF. The blockchain capability and status report message may include the same information of the blockchain capability and status solicitation response in the first method.

In yet another method, the BMF 802 may receive a normal transaction creation requests or blockchain transactions from blockchain clients 812. Then, it generates transactions and/or simply forwards transactions to selected blockchain nodes. the BMF 802 receives transaction responses from blockchain nodes accordingly. As a result, the BMF 802 may analyze the received and/or missing transaction responses to deduce the performance of blockchain nodes. It may even detect if a blockchain node 804a, 804b, and/or 804c goes offline although this is a passive approach.

If a blockchain client 812 interacts directly with a blockchain node 804a, 804b, and/or 804c, it may also monitor the performance of a blockchain node (e.g., blockchain node A) such as average transaction response time as perceived by the blockchain client, the average number of transactions that the blockchain client has sent to the blockchain node 804a, 804b, and/or 804c most recently. If the blockchain client 812 only interfaces with BCM/the BMF, it may not be able to monitor the performance of blockchain nodes but the BMF may passively monitor the performance of blockchain nodes. As a result, this may be skipped by the blockchain client. At 822, the blockchain client 812 may report the monitored performance of the blockchain node to the BMF 802.

At 824, the BMF 802 may collect requirement and context information of all blockchain clients 812. In one method, the BMF 802 may send a blockchain client requirement and context solicitation request to a blockchain client 812. Then, the blockchain client 812 sends a blockchain client requirement and context solicitation response to the BMF 802. The solicitation request may include the identifier/address of the blockchain client 812, one or multiple blockchain client requirements and context variables indicating that the blockchain client 812 only needs to include the value of these variables, the response time indicating that the blockchain client 812 needs to send back the solicitation response before this response time, etc. The solicitation response may include the identifier/address of the blockchain client 812, the value of blockchain client requirement and context variables as requested, the offline willingness indicating if the blockchain client is willing to go offline, the affordable offline duration indicating how long the blockchain client may afford to be offline, the offline starting time indicating when the blockchain client 812 is willing to start to go offline, existing offline schedules of the blockchain client 812.

In another method, the BMF 802 may first send a blockchain client requirement and context subscription request to a blockchain client 812. The blockchain client 812 first sends a blockchain client requirement and context subscription response to the BMF. After that, the blockchain client may send a blockchain client requirement and context notification to the BMF whenever its blockchain requirement and context has a change and meets the notification criteria as included in a blockchain client requirement and context request. The blockchain client 812 requirement and context notification may include the same information as the blockchain client requirement and context solicitation response as described above.

In yet another method, the BMF 802 may first configure a blockchain client requirement and context reporting period to each blockchain client 812. A blockchain client 812 may periodically send a blockchain client requirement and context report message to the BMF 802. The blockchain client requirement and context report message may include the same information of the blockchain client requirement and context solicitation response in the first method.

At 826, the BMF may monitor the performance of blockchain nodes since it generates or forwards transactions to blockchain nodes on behalf of blockchain clients. the BMF maintains a blockchain repository to record blockchain capability and status of blockchain nodes of its interest, based on the information as received from blockchain nodes in 820c, 820b, and/or 820c, the information as received from blockchain clients in 823, and/or the information from passive performance monitoring of blockchain nodes.

At 828, based on the information recorded in the blockchain node repository and in the blockchain client repository, the BMF 802 determines the next blockchain node(s) 804a, 804b, and/or 804c for going offline. For example, the BMF 802 may select the blockchain node with the least blockchain capability to go offline. the BMF 802 may have its own policies and rules for selecting or rotating blockchain nodes to be offline. Assume blockchain node A 804a is selected to go offline, the BMF 802 may also select another blockchain node (e.g., blockchain node B 804b) as the proxy node for blockchain node A 804a when blockchain node A 804a goes offline; the BMF 802 also determines an offline schedule for blockchain node A 804*a* (e.g., when blockchain node A 804*a* needs to go offline with an assigned offline level and how long it needs to stay offline). The BMF 802 may determine offline schedules for multiple blockchain nodes (e.g., blockchain node A 804*a* and blockchain node C 802*c*). Then, the BMF 802 may send separate notifications with their offline schedules (e.g., offline level, offline starting time, offline duration) to each blockchain node.

If blockchain node A 802*a* is determined to be offline, the BMF 802 may determine and assign one or multiple proxy nodes for blockchain node A 802*a*, based on some pre-configured rules or based on smart contracts.

the BMF 802 may select an online blockchain node close to blockchain node A 804*a* as the proxy node for blockchain node A 804*a*. In another example, during 828 or after 828, the BMF 802 may send a proxy node solicitation request to one or multiple online blockchain nodes to ask their willingness to be a proxy node for blockchain node A 804*a*. Then, the BMF 802 may receive a proxy node solicitation response from one or multiple online blockchain nodes. Next, the BMF 802 may select one or multiple received responses as corresponding online blockchain nodes as the proxy node for blockchain node A 804*a*. In another example, during 828 or after 828, the BMF 802 and online blockchain nodes may use smart contract to automatically select one or multiple proxy nodes for blockchain node A 804*a*.

the BMF 802 may also determine offline schedules (e.g., when going offline, how long staying offline, whether this offline schedule should be repeated and how many times or how long to be repeated, etc.) for one or multiple blockchain clients. For example, if a blockchain client 812 is willing to stay offline for some time, the BMF 802 may instruct it to be offline if the related blockchain node is chosen to be offline too. In another case, in order to mitigate the traffic overhead within the blockchain network and in turn improving transaction speed, the BMF 802 may select some blockchain clients to go offline based on their requirement and context information. In another example, if blockchain client 812 is going to trigger an existing smart contract that relies on an external oracle and the external oracle is offline or has an offline schedule, the BMF 802 may also instruct this blockchain client to go offline until the external oracle becomes online and available.

At 830, the BMF 802 may send a message to each of blockchain node A's 804*a* neighbors or its proxy nodes (i.e. blockchain node B 804*b*). This message may include the identifier/address of blockchain node A 804*a*, the assigned offline schedule of blockchain node A 804*a* (e.g., the offline starting time indicating when blockchain node A 804*a* may start to go offline, the assigned offline level for blockchain node A 804*a*, the offline duration indicating how long blockchain node A 804*a* may stay offline), a list of blockchain clients 812 that may migrate from blockchain node A 804*a* to blockchain node A's neighbors or its proxy node, etc.

At 832, if there are any blockchain clients 812 such as blockchain applications that directly interact and/or are associated with blockchain node A 804*a* (e.g., issue a transaction to blockchain node A 804*a*, query transaction/block information from blockchain node A 804*a*), the BMF 802 may also inform them of the offline schedule of blockchain node A 804*a* (e.g., the offline level, the offline duration, the offline starting time) and its proxy nodes (e.g., blockchain node B's identifier/address). the BMF 802 instructs blockchain node A 804*a*'s clients to interact with its proxy node when blockchain node A 804*a* is offline. Alternatively, the BMF 802 may simply instruct blockchain node A 804*a*'s clients to switch to use the BMF 802 and blockchain middleware as a proxy for indirectly interacting with other blockchain nodes. Also, in order to improve the reliability, the BMF 802 may request a blockchain client 812 to establish connections with both the BMF and one or multiple proxy nodes of blockchain node A. If the BMF 802 selected some blockchain clients to go offline at 826, the BMF 802 may inform each of these selected blockchain clients of the determined offline schedules for them (e.g., when to go offline, how long to stay offline, if offline schedules may be repeated and how many times to be repeated, etc.). the BMF 802 sends blockchain client instructions to the blockchain client 812 to instruct the blockchain client 812 with the following options. Alternatively, blockchain node A 804*a* may send these blockchain client instructions to the blockchain client 812.

In one example of blockchain client instruction, the blockchain client 812 may stop generating any new blockchain transaction for a first designated time duration. In another example of blockchain client instruction, the blockchain client should not generate new blockchain transactions more than a first designated rate. In another example of blockchain client instruction, the blockchain client 812 may send new blockchain transactions to a new blockchain node. In an example of blockchain client instruction, the blockchain client 812 may stop sending any new blockchain transaction for a second designated time duration. In another example of blockchain client instruction, the blockchain client 812 may not send new blockchain transactions more than a second designated rate. In another example of blockchain client instruction, the blockchain client 812 may send new blockchain transactions to the BMF 802. In another example of blockchain client instruction, the blockchain client 812 may contact a third blockchain node as the proxy node for the fourth blockchain node. In another example of blockchain client instruction, the blockchain client 812 may be informed that the fifth blockchain node becomes offline and also informed of the offline schedule of the fifth blockchain node.

the BMF 802 directs the blockchain client 812 to access blockchain node B 804*b*, which may be selected as the proxy node for blockchain node A 804*a*.

the BMF 802 asks blockchain client 812 to pause its interaction with blockchain nodes including blockchain node A until blockchain node A becomes online again after 842. For this purpose, the BMF 802 may tell blockchain client 812 how long it should be paused, which should be equal or larger than the offline duration of blockchain node A 804*a*. After 842, the blockchain client 812 may resume its interactions with blockchain node A 804*a*.

If blockchain client 812 was interfacing with the BMF 802, the BM F 802 may not inform it of anything about blockchain node A 804*a*. Instead, the BMF 802 allows blockchain client 812 to continue to send any messages to the BMF 802. Then, the BMF 802 may simply buffer any received message and send a quick acknowledgement to blockchain client 812 and tells it that the received message may be fully processed at a later time. When blockchain node A 804*a* becomes online, the BMF 802 may forward buffered messages to blockchain node A 804*a*; or when blockchain node A 804*a* becomes online, it may actively retrieve these buffered messages from the BMF 802.

If the blockchain client 812 was not interfacing with the BMF 802, the BMF 802 may instruct it to use the BMF 802 as a proxy for blockchain node A 804*a*. Then, the blockchain client 812 may send any messages to the BMF 802, and the BMF 802 simply buffers any received message and sends a quick acknowledgement to the blockchain client and tells it that the received message may be fully processed at a later time; when blockchain node A 804a becomes online, the BMF 802 may forward buffered messages to blockchain node A 804a; or when blockchain node A 804a becomes online, it may actively retrieve these buffered messages from the BMF 802.

At 834, the BMF 802 may send a message to blockchain node A 804a to instruct it to go offline. This message may include the identifier/address of the selected proxy for blockchain node A 804a (i.e. blockchain node B's 804b identifier/address), the assigned offline schedule (e.g., the offline starting time indicating when the blockchain node may start to go offline, the assigned offline level, the offline duration indicating how long blockchain node A 804a may stay offline, if the offline schedule needs to be repeated and how many times or how long to be repeated, etc.), etc. Note that, if blockchain node A 804a is operating an old offline schedule that was previously assigned by the BMF 802, the newly assigned offline schedule may replace the old schedule.

At 836, Blockchain node A 804a may start to go offline for the offline duration as received at 834. When blockchain node A 804a stays offline, it may not receive nor process any normal blockchain transactions. Before going offline, blockchain node A 804a may alternatively send blockchain client instructions to blockchain client 812, similar to what the BMF 802 sent to blockchain client 812 at 832.

At 838, blockchain clients of blockchain node A 804a may send a hello or registration message to the proxy node of blockchain node A 804a.

At 838, the blockchain client 812 may continue to interact with other blockchain nodes 804b, and/or 804c either directly via proxy nodes of blockchain node A 804a and/or indirectly via the BMF 802. At some time before 842, the BMF 802 may determine to wake up blockchain node A 804a earlier than the assigned offline schedule to keep the blockchain system run normally, for example, if more other blockchain nodes are just detected being entered into level-5 offline mode. It is noted that the BMF 802 may be able to communicate with blockchain node A 804a and wake it up when blockchain node A's 804a offline level is, for instance, offline level-1, offline level-2, offline level-3, or offline level-4. As a result, the BMF 802 sends a wake-up instruction to blockchain node A 804a, which may include the identifier/address of blockchain node A 804a, the online starting time for blockchain node A 804a, new offline schedules, synchronization instructions for blockchain node A 804a to synchronize itself with the normal blockchain, etc. Network entities in underlying communication infrastructure such as base stations and AMF in 5GS may help to relay the wake-up instructions to blockchain node A 804a, via underlying communication control signaling such as application triggering services in 5GS.

At 842, after the scheduled offline duration or triggered by the BMF 802 as a part of 840, blockchain node A 804a may return online.

At 844, Blockchain node A 804a may send a message to the BMF 802 to announce it returning online and reports its current blockchain capability and status. Blockchain node A 804a may also send the same message to its proxy (i.e., blockchain node B 804b) and its neighbors.

At 846, Blockchain node A 804a may contact its proxy node (i.e., blockchain node B 804b) or other neighboring blockchain nodes to synchronize itself with the normal blockchain (e.g., to download normal blocks and transactions that have been created when it was offline). If the BMF 802 maintains the entire normal blockchain, blockchain node A 804a may also directly retrieve missing transactions/blocks from the BMF 802; or the BMF 802 may actively push missing transactions/blocks to blockchain node A since it knows the offline schedule of blockchain node A 804a. If the proxy node was not determined at 828, blockchain node A 804a may randomly select one of its neighbors to retrieve the normal blockchain.

At 848, the BMF 802 optionally sends a message to blockchain node A's clients to inform them that blockchain node A 804a is back online now. As a result, these clients may switch to interact with blockchain node A 804a again.

Figure 9:
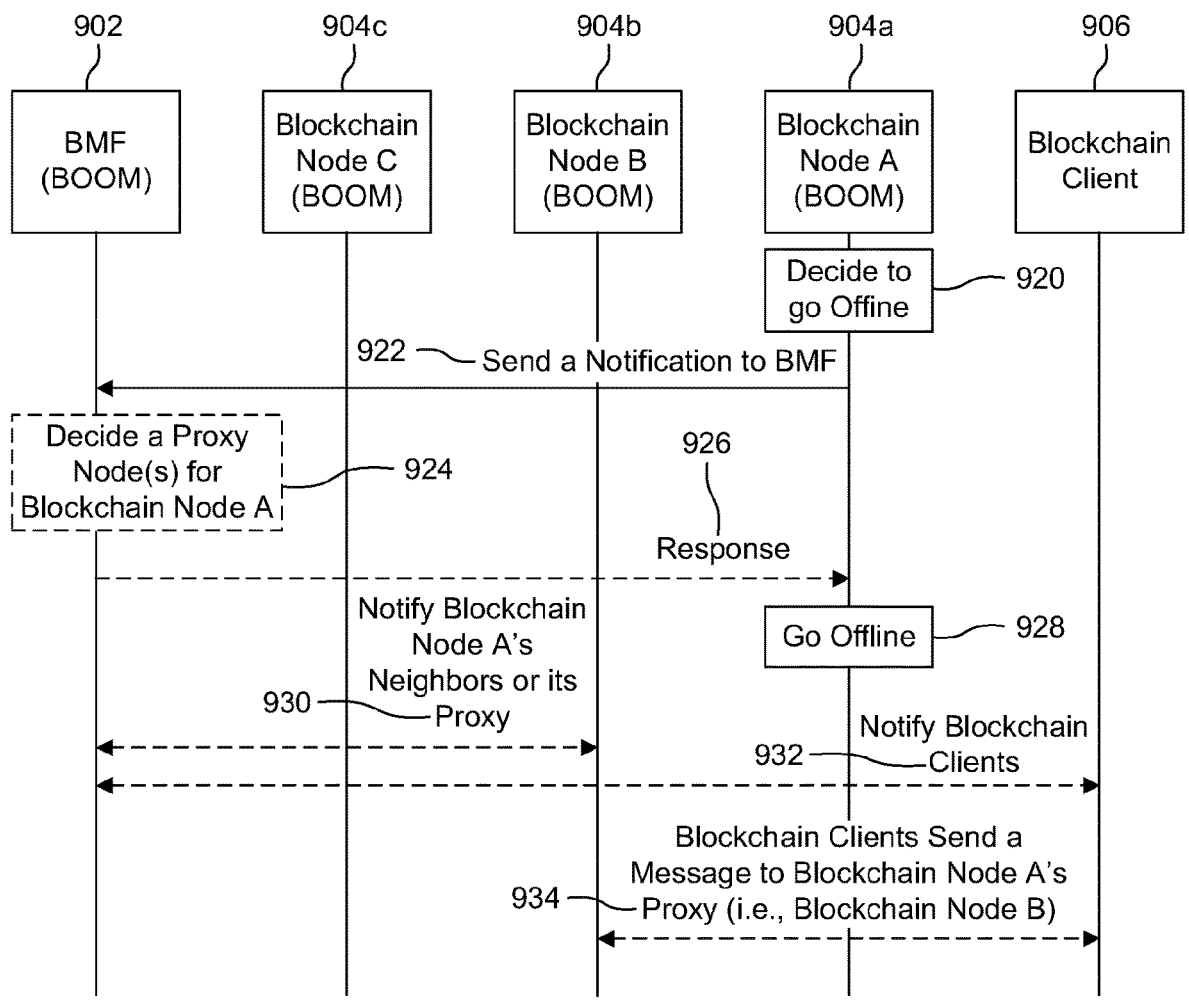
FIG. 9 illustrates exemplary procedures for passive off-chain blockchain offline operations management.

FIG. 9 illustrates a passive off-chain BOOM. At 920, blockchain node A 904a may decide when to go offline according to its own offline schedules. Before 920, the BMF 902, blockchain nodes and blockchain clients may have performed 820a, 820b, and/or 820c and 822, and 824, as shown and discussed in FIG. 8. As a result, the BMF 902 may have maintained blockchain node repository and blockchain client repository.

At 922, Blockchain node A 904a may send a notification to the BMF 902 to indicate its own offline schedules (e.g., when it may go offline, on which offline level, and how long it may stay offline). Blockchain node A 904a may also explicitly request the BMF 902 to select a proxy node for it. If blockchain node A 904a has to go offline first without sending such a notification to the BMF 902, its neighbors may detect its offline status (e.g., if there is no response message from blockchain node A to its neighbors when a neighbor sends a transaction to it) and notify the BMF 902 that blockchain node A 904a is offline now. In this case, 922, 924, and 926 may not be needed. When a neighbor sends such a notification to the BMF 902, the notification may include the identifier/address of both the neighbor and blockchain node A 904a.

At 924, which is optional, the BMF 902 may decide one or multiple proxy nodes for blockchain node A 904a based on the information received from the notification at 922 and the information maintained in the blockchain node repository. the BMF 902 marks those proxy nodes (e.g., blockchain node B 904b) in the blockchain node repository. the BMF 902 may determine some new offline schedules for blockchain node A. The BMF 902 may also determine offline schedules (e.g., when going offline, how long staying offline, whether this offline schedule should be repeated and how many times or how long to be repeated, etc.) for one or multiple blockchain clients 906.

At 926, which is optional, the BMF 902 sends a response to blockchain node A 904a. The response message may include the identifier/address of the determined proxy nodes for blockchain node A 904a or any instructions/hints that blockchain node A 904a may use for blockchain synchronization when blockchain node A 904a wakes up in the future. The response may include a new offline schedule suggestion that the BMF 902 has determined at 924 and it may be up to blockchain node A 904a to decide whether it intends to stick to its own schedule and adopts the suggestion from the BMF 902.

At 928, Blockchain node A 904a may start to go offline for the offline duration.

At 930, the BMF 902 may send a message to each of blockchain node A's 904a neighbors or its proxy nodes (i.e. blockchain node B 904b). This message may include the identifier/address of blockchain node A 904a, the assigned offline schedule of blockchain node A 904a (e.g., the offline starting time indicating when blockchain node A 904a may start to go offline, the assigned offline level for blockchain node A 904*a*, the offline duration indicating how long blockchain node A 904*a* may stay offline), a list of blockchain clients 906 that may migrate from blockchain node A 904*a* to blockchain node A's neighbors or its proxy node, etc.

At 932, if there are any blockchain clients 906 such as blockchain applications that directly interact and/or are associated with blockchain node A 904*a* (e.g., issue a transaction to blockchain node A 904*a*, query transaction/block information from blockchain node A 904*a*), the BMF 902 may also inform them of the offline schedule of blockchain node A 904*a* (e.g., the offline level, the offline duration, the offline starting time) and its proxy nodes (e.g., blockchain node B's identifier/address). the BMF 902 instructs blockchain node A 904*a*'s clients to interact with its proxy node when blockchain node A 904*a* is offline. Alternatively, the BMF 902 may simply instruct blockchain node A's 904*a* clients to switch to use the BMF 902 and blockchain middleware as a proxy for indirectly interacting with other blockchain nodes. Also, in order to improve the reliability, the BMF 902 may request a blockchain client 906 to establish connections with both the BMF and one or multiple proxy nodes of blockchain node A. If the BMF 902 selected some blockchain clients to go offline at 924, the BMF 902 may inform each of these selected blockchain clients of the determined offline schedules for them (e.g., when to go offline, how long to stay offline, if offline schedules may be repeated and how many times to be repeated, etc.). the BMF 902 sends blockchain client instructions to the blockchain client 912 to instruct the blockchain client 912 with the following options. Alternatively, blockchain node A 904*a* may send these blockchain client instructions to the blockchain client 912. 932 is similar to 832 as described in FIG. 8.

At 934, blockchain clients of blockchain node A 904*a* may send a hello or registration message to the proxy node of blockchain node A 904*a*.

FIG. 10 illustrates on-chain BOOM where blockchain nodes leverage online blockchain operations/mechanisms, such as blockchain transactions and even blockchain smart contracts, to manage their offline schedules in an autonomous and decentralized way.

The BMF 1002 may be optional and it may be leveraged to provide blockchain nodes 1002*a*-1002*e* with some offline-management related policies or rules, but it may not maintain blockchain node repository (or blockchain client repository) nor decide the next blockchain node(s) for going offline. In other words, all the offline decisions may be fully decided in a decentralized way, based on certain consensus protocol (conducted among blockchain nodes) as mentioned in the following texts. A new blockchain (e.g., a designated channel in Hyperledger Fabric), referred to as Management-Purpose Blockchain (MPB), may be designed and dedicated for such on-chain BOOM. Alternatively, MPB may be the same as the normal blockchain, which blockchain nodes operate when they are online. Two on-chain BOOM approaches are proposed.

Figure 11:
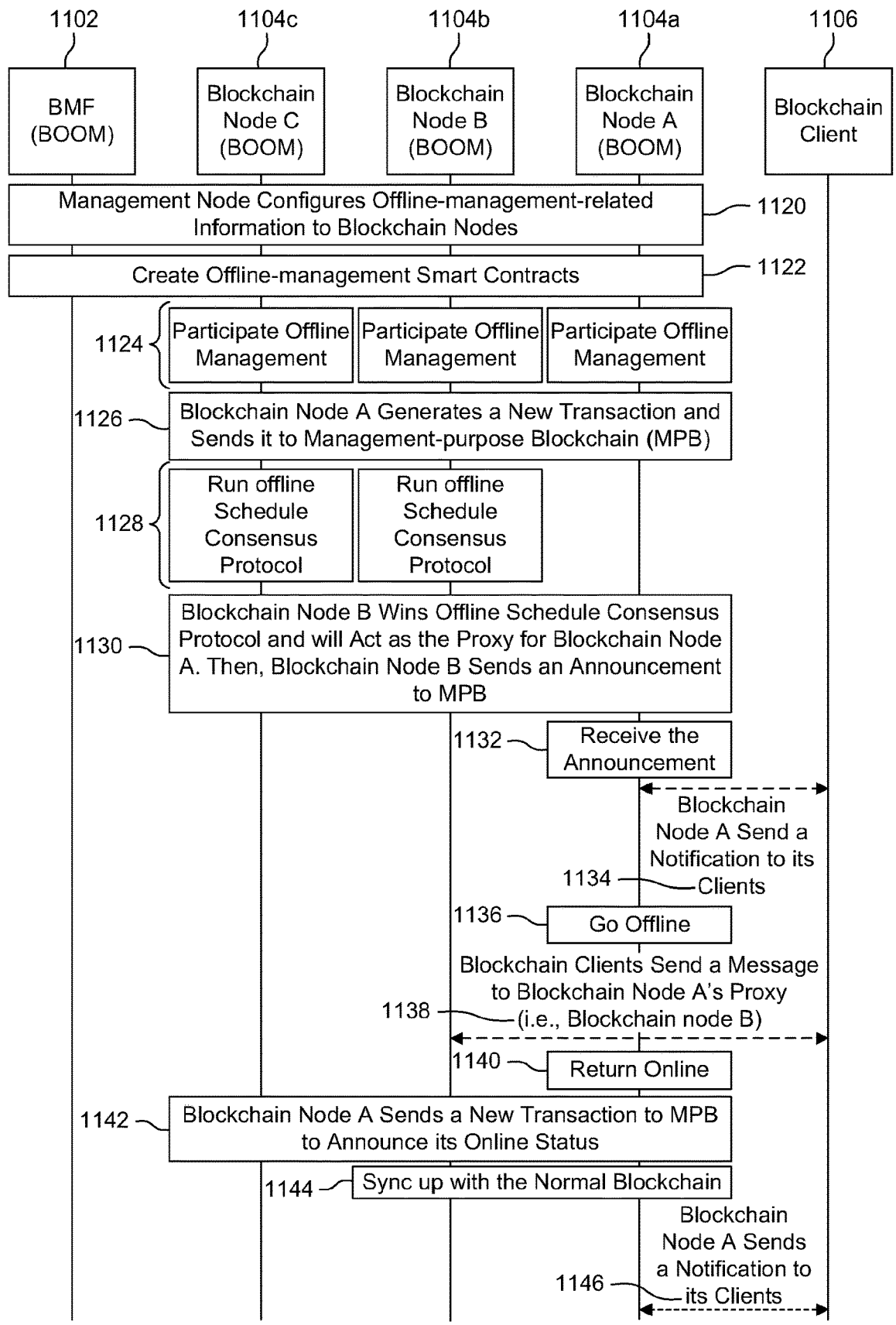
FIG. 11 illustrates an exemplary procedure for on-chain BOOM.

In one approach, which is illustrated in FIG. 11, blockchain node A 1104*a* may actively request to go offline and may solicit another blockchain node B 1104*b* as its proxy when it is offline. Other blockchain nodes may verify and approve such requests. At last, blockchain node A 1104*a* may start its offline schedules. Offline-management smart contracts are designed to coordinate this process.

Offline-management smart contracts are created and stored onto MPB. Blockchain node A 1104*a*, when it needs to go offline, generates an offline-management transaction, and sends it to MPB to trigger an existing offline-management smart contract. As a result, an offline duration and a proxy node for blockchain node A 1104*a* may be automatically determined based on the corresponding offline-management smart contract.

Figure 12:
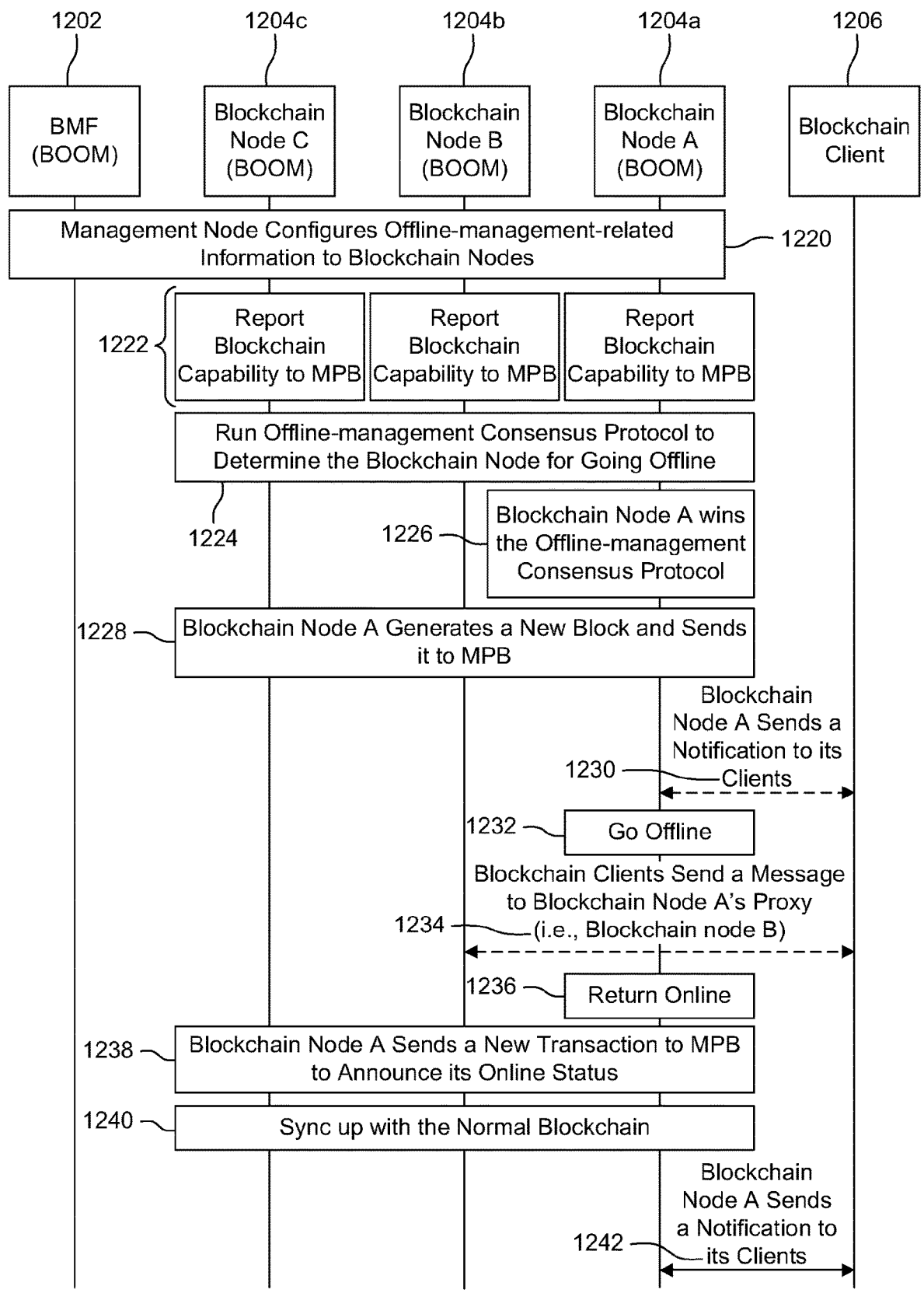
FIG. 12 illustrates another exemplary procedure for on-chain BOOM.

In another approach, which is illustrated in FIG. 12, each blockchain node 1204*a*, 1204*b*, and/or 1204*c* may periodically and independently reports its blockchain capability and/or status to MPB. Then, special consensus protocols may be designed to autonomously select appropriate blockchain nodes for going offline. For instance, Proof of Blockchain Capability (PoBC) may be designed to allow the blockchain node 1204*a*, 1204*b*, and/or 1204*c* with the least blockchain capability to be selected and enter into an offline mode for an amount of time. All blockchain nodes 1204*a*, 1204*b*, and/or 1204*c* run such a special consensus protocol to reach the consensus on new blockchain nodes to stay offline for a time interval, after which they may return online.

In comparison, the first approach in FIG. 11 is based on smart contracts and needs to create and maintain offline-management smart contracts, which cause extra overhead especially if there are not many blockchain nodes needing offline schedules. For example, an existing offline-management smart contract may become outdated and as a result, new smart contracts need to be created again since the existing one on MPB cannot be modified. But one advantage of the first approach is that the determination of offline nodes and their proxy nodes do not rely on consensus protocol and has less overhead since it is based on what is specified in offline-management smart contracts, compared to the second approach.

The second approach in FIG. 12 does not use any smart contracts, but each blockchain node needs to periodically report its blockchain capability and/or status onto MPB in order to run protocol, which causes an extra overhead especially when such reports become more necessarily frequent. But the second approach does not have the overhead for creating and maintaining offline-management smart contract. Also, if offline-management consensus protocol needs to be updated, it may easily be done by a software update and does not need to modify MPB or create any new transactions. In common, both approaches provide a decentralized and autonomous determination of blockchain nodes for going offline.

The BMF/BOOM may be a logical function entity and may perform the following functions in on-chain blockchain offline operations management: (1) configures blockchain nodes with some necessary configuration information such as policies and rules for on-chain blockchain offline operations management and (2) create offline-management smart contracts and store them to MPB.

Also, BOOM in a blockchain node may be a logical function entity and may perform the following functions in on-chain offline operations management: (1) receive offline-management-related configuration information from the BMF/BOOM; (2) generate offline-management transactions to MPB to trigger offline-management smart contracts; (3) verify and execute offline-management smart contracts; (4) generate offline-management transactions to report the blockchain capability of blockchain nodes to MPB to be known by all blockchain nodes; and (5) participate in offline-management consensus protocols and automatically determines offline-management results in a decentralized and autonomous way.

In on-chain blockchain offline operations management, BOOM in the BMF may have much fewer functions than BOOM in the BMF for off-chain blockchain offline operations management. In on-chain blockchain offline operations management, BOOM in blockchain nodes acts as a logic BOOM server and client role. the BMF and the BMF/BOOM may be used interchangeably unless there is an explicit clarification. Likewise, a blockchain node by default has a BOOM unless an explicit clarification is made. The proposed BOOM functions in this invention include both BOOM in the BMF and BOOM in blockchain nodes.

As an extension, the proposed BMF/BOOM may be defined as a logical role/function (instead of acting as a centralized physical node), i.e. the BMF/BOOM may be acted by different physical nodes. For example, different blockchain nodes may be regarded as physical nodes, and among those nodes, they may vote and select one node to be the one to have the BMF/BOOM and conducting the proposed BOOM function as mentioned earlier. For example, the physical nodes may conduct certain voting or consensus protocol in order to determine which physical blockchain node is acting as a the BMF/BOOM node during a certain time interval. After such a node is decided, all the blockchain nodes may be informed. Such a the BMF node selection process may be re-conducted or be triggered periodically. In addition, when the proposed BOOM makes any offline decision for the blockchain nodes, the decision may be made in a system-wide way. For example, instead of deciding whether a specific blockchain node should go offline or not, the BMF/BOOM may make a global decision for a list of or a group of blockchain nodes. Or when deciding whether a specific blockchain node should go offline or not, the BMF/BOOM may consider its previous decisions made to other blockchain nodes.

FIG. 11 illustrates one proposed approach for on-chain BOOM. At 1120, which may be optional, the BMF 1102 may configure each blockchain node 1104a, 1104b, and 1104c with some necessary information for offline operations management. For example, the BMF 1102 first notifies each blockchain node 1104a, 1104b, and 1104c if it is allowed to go offline or perform offline schedules. the BMF 1102 may also configure some offline conditions, under which a blockchain node may request for offline schedules. the BMF 1102 may also provision offline schedules for blockchain nodes, which are allowed to go offline.

At 1122, the BMF 1102 may formulate an offline-management smart contact, create a new transaction including the offline-management smart contract, and sending the new transaction to MPB. As a result, the offline-management smart contract may eventually be stored onto MPB. The offline-management smart contract may define a list of input parameters such as offline schedules, a list of blockchain nodes that are allowed to go offline, the offline conditions under that a blockchain node may request offline schedules, the proxy conditions that a blockchain node may run as a proxy for one or multiple offline blockchain nodes, the cost a blockchain node A 1104a needs to pay if it goes offline, and the reward another blockchain node B 1104b may collect from blockchain node A 1104a if blockchain node B 1104b acts as the proxy for blockchain node A 1104a when it goes offline. A blockchain node may use the gained reward to request and pay for future offline schedules.

For example, the BMF 1102 may create one offline-management smart contract for all blockchain nodes to use. the BMF 1102 may also create a different offline-management smart contract for and to be used by each blockchain node. Alternatively, each blockchain node may create its own and similar offline-management smart contract based on its requirements and the information as received at 1120 from the BMF 1102. The created smart contract may include similar information as described above for offline-management smart contract to be created by the BMF 1102. For this scenario, blockchain node A 1104a formulates an offline-management smart contract, creates a new transaction including the offline-management smart contract, and sending the new transaction to MPB.

At 1124, other blockchain nodes 1104a, 1104b, and/or 1104c may receive the offline-management smart contract from MPB and participates in the offline management according to the offline-management smart contract. For example, each blockchain node 1104a, 1104b, and/or 1104c may start to monitor and collect parameters such as the blockchain capability, as described in the offline-management smart contract.

At 1126, when an offline condition is satisfied at blockchain node A 1104a (e.g., when the blockchain node has a heavily decreased communication capacity and/or a reduced computing power), blockchain node A 1104a may create a new offline-management transaction with a certain probability, which may be specified in the offline-management smart contract. As an example, a new offline-management transaction requesting for a longer offline period may be generated with a smaller probability, so that a certain number of blockchain nodes may always be online. If a new offline-management transaction is created, the blockchain node A 1104a sends the new offline-management transaction to MPB to address and trigger the target offline-management smart contract as stored on MPB.

The purpose of sending this offline-management transaction is for blockchain node A 1104a to request for entering an offline mode for a time interval. The time interval may be included in this offline-management transaction and provided as an input parameter to the target offline-management smart contract or be a fixed value specified by and included in the target offline-management smart contract. This offline-management transaction may also include the expected offline level.

In this offline-management transaction, the blockchain node A 1104a may specify another blockchain node B 1104b as its proxy after it enters the offline mode. The selection of the blockchain node B 1104b as the proxy may have been included in the target offline-management smart contract. For example, there may be multiple offline-management smart contracts stored on MPB and each offline-management smart contract has a different proxy node.

At 1128, other blockchain nodes 1104a, 1104b and/or 1104c may receive and verify the new offline-management transaction. The invalid offline-management transaction may be discarded without any further processing. For example, if an offline-management transaction does not include or provide a full list of input parameters as required by the target offline-management smart contract, it may be regarded as an invalid one and may be discarded. Then, they run the offline-management consensus protocol. The winner of the offline-management consensus protocol may execute the corresponding target offline-management smart contract (i.e., the one as triggered by the offline-management transaction) and behave as the proxy for blockchain node A 1104a when it goes offline. The execution of the target smart contract may determine which blockchain node should go offline and corresponding offline schedule (e.g., when going offline, how long going offline for, whether this offline schedule should be repeated and how many time or how long to be repeated).

At 1130, as a result of an offline-management consensus protocol and/or the execution of target offline-management smart contract, an offline schedule (e.g., offline level, offline starting time, offline duration) and a proxy node for blockchain node A 1104a may be agreed. Then, the winner (e.g., blockchain node B 1104b) adds the offline-management transaction and the consensus result (i.e., the offline schedule and the proxy node) onto MPB and announces them to all other blockchain nodes. As an example, if a proxy node has been specified in the offline-management transaction in 1126, the proxy node may be the winner of the offline-management consensus protocols.

At 1132, Blockchain node A 1104a may receive the announcement that was sent by the winner of the offline-management consensus protocol at 1130. Blockchain node A 1104a may go offline according to the agreed offline schedule.

At 1134, if there are any blockchain clients such as blockchain applications that interact and/or are associated with blockchain node A 1104a, blockchain node A 1104a may also inform them of its offline schedule and its proxy node. In short, blockchain node A instructs its clients to interact with its proxy node when it is offline.

At 1136, Blockchain node A 1104a may go offline for the time interval as agreed and announced at 1130. During this time duration, it may not receive nor process any normal blockchain transactions.

At 1138, which may be optional, blockchain clients 1106 of blockchain node A 1104a may send a hello or registration message to the proxy node of blockchain node A 1104a.

At 1140, after the scheduled offline duration, blockchain node A 1104a may return online.

At 1142, Blockchain node A 1104a may send a new transaction to MPB to announce it returning online.

At 1144, Blockchain node A 1104a may contact its proxy node (i.e., blockchain node B) to synchronize itself with the normal blockchain (e.g., to download normal transactions/blocks that have been created when it was offline). The process shown in FIG. 13 may be leveraged for this synchronization.

At 1146, Blockchain node A 1104a may optionally send a message to its clients 1106 to inform them that it is back online now. As a result, these clients may switch to interact with blockchain node A 1104a again.

As shown in FIG. 11, the BMF 1102 may optionally be designed and implemented to have full functions of a blockchain node; for this case, the BMF 1102 may receive transactions and blocks and host blockchains including MPB.

FIG. 12 illustrates another approach for on-chain BOOM. At 1220, the BMF 1202 may configure each blockchain node with some necessary information for offline management. This may be optional and similar 1120 in FIG. 11. For example, the BMF 1202 notifies each blockchain node 1204a, 1204b, and/or 1204c if it is allowed to go offline or perform offline schedules. the BMF 1202 may configure some offline schedule conditions, under which a blockchain node may request for offline schedules. the BMF 1202 may also provision offline schedules for blockchain nodes 1204a, 1204b, and/or 1204c, which are allowed to go offline. Only the blockchain nodes that are allowed to go offline may participate in the consensus process at 1224.

As 1222, each blockchain node 1204a, 1204b, and/or 1204c may report its current blockchain capability by sending a new transaction to MPB. The new transaction may include the following information: Blockchain Node Identifier; Current Time; Expiration Time; Offline Flag; Earliest Offline Time; Expected Offline Duration; Expected Offline Duration; Neighbor Nodes; and Expected Offline Level. Blockchain Node Identifier may refer to the identifier or the address of the blockchain node that sends this new transaction. Current Time may refer to the current time when this new transaction is sent. Blockchain Capability may refer to the blockchain capability of the blockchain node that sends this new transaction. As aforementioned, Blockchain Capability may consist of multiple variables. Expiration Time may refer to the lifetime of the reported blockchain capability. Offline Flag may refer to the blockchain node that sends this new transaction is allowed to go offline. Earliest Offline Time may refer to the earliest time that the blockchain node that sends this new transaction may or is willing to go offline. Expected Offline Duration may refer to the time duration that the blockchain node would like to go offline. Neighbor Nodes may refer to a list of blockchain nodes that are one-hop neighbors of the blockchain node sending this new transaction. Expected Offline Level may refer to the expected offline level that the blockchain node may enter into.

At 1224, each blockchain node 1204a, 1204b, and/or 1204c may perform the same offline-management consensus protocol (e.g., PoBC) to determine the next blockchain node that may go offline.

At 1226, as an example, blockchain node A may win the consensus protocol. In other words, all other blockchain nodes agree that blockchain node A 1204a may be selected as the next blockchain node for going offline. As a part of the completion of the consensus protocol, the offline duration and optionally a proxy node for blockchain node A 1204a may be also determined, which together with the identifier of blockchain node A 1204a may be referred to as offline-management consensus result.

At 1228, Blockchain node A 1204a may generate a new block (referred to as an offline-management block), which may include one or multiple transactions as generated at 1222. Blockchain node A 1204a sends this new block to MPB. The header of this new block may include the an offline-management consensus result, which may indicate the identifier or address of blockchain node A 1204a, the assigned offline level, the offline duration, the offline starting time, whether this offline schedule may be repeated, how many times and how long this offline schedule may be repeated, the identifier or address of the proxy node, etc.

At 1230, if there are any blockchain clients such as blockchain applications that interact and/or are associated with blockchain node A 1204a, blockchain node A 1204a may also inform them of its offline duration and its proxy node (e.g., blockchain node B 1204b). Here, blockchain node A 1204a may instruct its clients 1206 to interact with its proxy node when it is offline.

At 1232, Blockchain node A may go offline for the offline duration as determined at 1228. Blockchain node A may not receive nor process any normal blockchain transactions.

As 1234, which may be optional, blockchain clients 1206 of blockchain node A 1204a may send a hello or registration message to the proxy node of blockchain node A 1204a.

At 1236, after the scheduled offline duration, blockchain node A 1204a may return online.

At 1238, Blockchain node A 1204a sends a new transaction to MPB to announce it returning online and reports its current blockchain capability.

At 1240, Blockchain node A 1204a contacts its proxy node (i.e., blockchain node B 1204b) to synchronize itself with the normal blockchain (e.g., to download normal transactions/blocks that have been created when it was offline). If the proxy node was not determined at 1226, blockchain node A 1204a may randomly select one of its neighbors to retrieve the normal blockchain. The process described in FIG. 13 may be leveraged for this synchronization.

At 1242, which may be optional, Blockchain node A 1204a may send a message to its clients to inform them that it is back online now. As a result, these clients may switch to interact with blockchain node A 1204a again.

As shown in FIG. 12, the BMF 1202 may optionally be designed and implemented to have full functions of a blockchain node. For this case, the BMF 1202 may receive transactions and blocks and host blockchains including MPB.

If blockchain node A 1204a goes offline for a designated offline duration and now wakes up. Blockchain node B 1204b and blockchain node C 1204c are the neighbors or the proxy node of blockchain node A 1204a when it went offline. the BMF 1202 may maintain blockchain capability and status of all blockchain nodes including blockchain node B 1204b and blockchain node C 1204c. Now, blockchain node A 1204a may need to synchronize itself with the up-to-date normal blockchain, which blockchain B 1204b and blockchain node C 1204c may have and may act as blockchain synchronization helpers for blockchain node A 1204a. Note that, during the synchronization, the synchronization helper should not go offline based on the offline operations management as proposed in this invention. For example, the helper should indicate to the BMF 1202 that it is currently not willing to go offline due to an on-going synchronization process. The blockchain synchronization proposed in this invention may be more efficient than all the existing solutions, since there was no any coordination and offline operations management among the different blockchain nodes.

Figure 13:
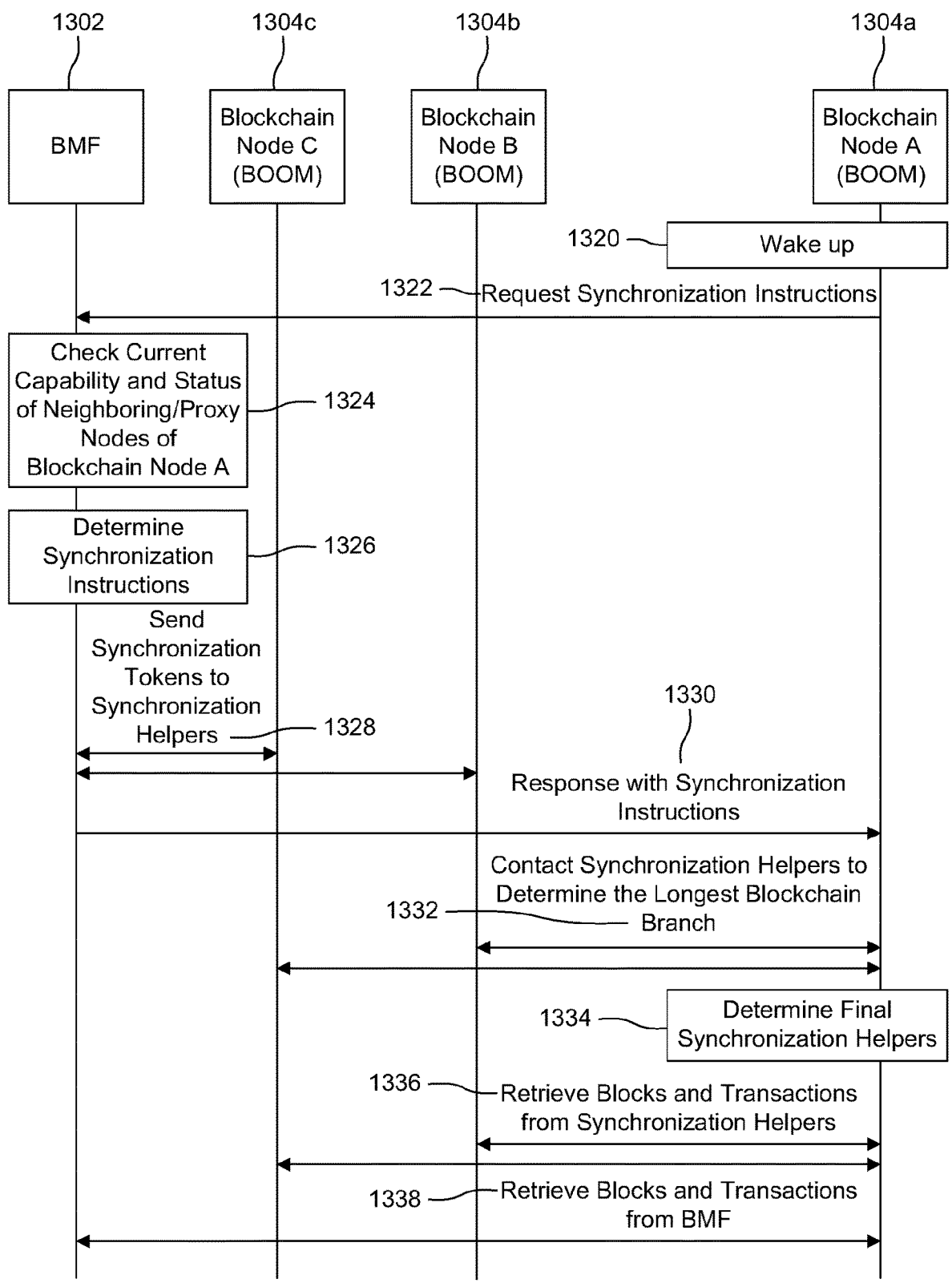
FIG. 13 illustrates exemplary procedures for blockchain synchronization.

FIG. 13 shows the procedure for blockchain node A 1304a to synchronize itself with the normal blockchain. At 1320, Blockchain node A 1304a wakes up after staying offline for an offline duration. At 1322, which may be optional, if the BMF 1302 maintains blockchain node repository, blockchain node A 1304a sends a request to the BMF 1302 to check the current status of its neighboring nodes or its proxy nodes. This request may also solicit synchronization instructions from the BMF 1302. This request may include the identifiers/addresses of the neighboring/proxy nodes of blockchain node A 1304a (e.g., the identifiers/addresses of blockchain node B 1304b and blockchain node C 1304c). If the procedure described at 1322 is not needed, the procedures described at 1324, 1326, 1328, and 1330 may be skipped. This request may also include additional context information about blockchain node A 1304a such as its current location and available communication connectivity/bandwidth. This request may also include the identifier or sequence number of the most recent transaction/block that blockchain node A 1304a has stored.

At 1324, the BMF 1302 may check the current capability and status of neighboring/proxy nodes of blockchain node A 1304a, against the maintained blockchain node capability and status.

At 1326, the BMF 1302 may determine synchronization instructions for blockchain node A 1304a, by jointly considering multiple factors, including but not limited to, context information of blockchain node A 1304a (e.g., its current location and available communication connectivity/bandwidth), blockchain capability, and status of blockchain node B 1304b and blockchain node C 1304c (e.g., the identifier or sequence number of the latest block they have, the identifiers or sequence numbers of unspent transactions they have stored, their current communication connectivity/bandwidth, their location). If the BMF 1302 does not have the latest blockchain capability and status information about blockchain node B 1304b and blockchain node C 1304c, the BM F 1302 may send a request to them. As a result, blockchain node B 1304b and/or blockchain node C 1304c may each send a response including their latest blockchain capability and status to the BMF 1302. Synchronization instructions may include a list of synchronization helpers, their addresses, the available blocks and unspent transactions at each synchronization helper, the order that blockchain node A 1304a should use to contact synchronization helpers. Likely, the previous neighboring/proxy nodes of blockchain node A 1304a may be selected as synchronization helpers, but the BMF 1302 may use different algorithms to determine appropriate helpers and synchronization instructions for blockchain node A 1304a. For example, another blockchain node within the proximity of blockchain node A 1304a may be preferably selected as a synchronization helper to reduce communication overhead. In another example, a blockchain node with higher process power and more missing blocks/transactions may be selected as a preferred synchronization helper. In another example, a blockchain node with a lower probability to go offline in the future may be selected as a preferred synchronization helper.

At 1328, the BMF 1302 may contact each determined synchronization helper (e.g., blockchain node B 1304b and/or blockchain node C 1304c) to provide them with a synchronization token, which may be including or based on the identifier/addresses of blockchain node A 1304a. The synchronization token may be unique for blockchain node A 1304a and may also define how blockchain node A 1304a should contact the synchronization helper (e.g., at what time and for how long). As a result, synchronization helpers may leverage it for verifying that only blockchain node A 1304a is allowed to retrieve any missing blocks/transactions from the synchronization helper. If another blockchain node D requests to retrieve missing blocks/transactions from a synchronization helper (e.g., blockchain node B 1304b), the synchronization helper may reject the request if blockchain node D does not present a matching synchronization hint or token, or if the way blockchain node D contacts the synchronization helper does not match what the synchronization token defines. Then, each synchronization helper may evaluate the received synchronization tokens and decides to agree as a helper or not. Each synchronization helper may send a response indicating an agreement or a disagreement as a helper to the BMF 1302. If a synchronization helper indicates a disagreement, the management node may remove it from synchronization instructions to be sent to the blockchain node at 1330.

At 1330, the BMF 1302 may send a response with synchronization instructions as determined at 1326 and 1328 to blockchain node A 1304a.

At 1332, blockchain node A 1304a contacts each synchronization helper to determine the longest blockchain branch. If 1322, 1324, 1328, and 1330 are skipped, blockchain node A 1304a may use the same process to contact its previous neighboring/proxy node to check the longest blockchain branch. First, blockchain node A 1304a may send the longest blockchain branch request to each synchronization helper. This request may include the identifier/address of blockchain node A 1304a, the identifier or sequence number of the most recent block that blockchain node A 1304a has, etc. Then, each synchronization helper sends the longest blockchain branch response to blockchain node A 1304a. This response includes the identifier/address of the last block on the longest blockchain branch.

At 1334, blockchain node A 1304*a* may select the blockchain branch that was reported by one or more synchronization helpers at 1332, as the longest blockchain branch. The blockchain nodes that reported the longest blockchain branch may be selected as final synchronization helpers.

At 1336, blockchain node A 1304*a* contacts each final synchronization helper to retrieve missing blocks and unspent transactions. First, blockchain node A 1304*a* may send a block/transaction request to each final synchronization helper. This request may include the identifier/address of blockchain node A 1304*a*, the range of missing blocks, the range of unspent transactions, etc. Then, each final synchronization helper sends a block/transaction response to blockchain node A 1304*a*. This response may include the content of one or multiple missing blocks, one or multiple unspent transactions, etc.

At 1338, as an alternative to 1336, (especially when there is no synchronization helper available or if the process described at 1306 fails), blockchain node A 1304*a* may contact the BMF 1302 and retrieve missing blocks and unspent transactions from the BMF 1302 if the BMF 1302 maintains the normal blockchain and participate in the normal blockchain operation. First, blockchain node A 1304*a* sends a block/transaction request to the BMF 1302. This request may include the identifier/address of blockchain node A 1304*a*, the range of missing blocks, the range of unspent transactions, etc. Then, the BMF 1302 may determine and contact other blockchain nodes to retrieve missing blocks and unspent transactions, as requested by blockchain node A 1304*a*. Last, the BMF 1302 may send a block/transaction response to blockchain node A 1304*a*. This response may include the content of one or multiple missing blocks, one or multiple unspent transactions, etc.

A blockchain node may randomly go offline without following any prescheduled offline schedules. Thus, other blockchain nodes may not be aware of its offline status (especially those nodes are in level-5 offline mode for example). As a part of the blockchain P2P routing protocol, each blockchain node maintains its neighboring blockchain nodes and is a neighboring blockchain node of other blockchain nodes. Neighboring blockchain nodes are well-positioned for detecting and reporting offline blockchain nodes. Without the loss of generality, assume blockchain node A has two neighbors: blockchain node B and blockchain node C. The following implementations are described for offline blockchain node detection.

In one implementation, neighboring blockchain nodes periodically and actively check their status with each other. Both blockchain node B and blockchain node C exchange periodical hello messages with blockchain node A. The hello message may simply include their identifiers/addresses and are used to confirm the online status of each other. For example, the hello message from blockchain node A to blockchain node B (or vice versa) may include the identifiers/addresses of both nodes. If blockchain node A goes offline, there are several ways for blockchain node B (or blockchain node C) to detect this event.

If blockchain node A knows it may go offline at a certain time t1, t1 may be included in a hello message to blockchain node B. After blockchain node B receives this hello message, it may know when blockchain node A may go offline. Alternatively, blockchain node B may first send a hello message to blockchain A. Then, blockchain node A may send a response message to blockchain node B and includes t1 in the response message; blockchain node B receives the response message and knows when blockchain node A may go offline.

When blockchain node A goes offline randomly, there is no hello or response message from it to blockchain node B. In this case, blockchain node B may passively wait for a time interval and regard blockchain node A as an offline node if receiving no message from blockchain node A during the time interval. Alternatively, blockchain node B sends a hello message to blockchain node A requesting a response. If it does not receive any response from blockchain node A, blockchain node B may determine that blockchain node A is offline.

In another implementation, a blockchain node passively deduces the status of their neighboring nodes or itself without using hello messages. If blockchain node A goes offline randomly at time t2, then at time t3, blockchain node B may receive a new transaction (or a new block), it forwards the new transaction (or the new block) to its neighbors including blockchain node A and expects to receive a response from each neighbor. If blockchain node B does not receive the expected response from blockchain node A within a time duration, it may mark blockchain node A as an offline node.

In another implementation, if blockchain node B is used to receive transactions (or blocks) from blockchain node A and other blockchain nodes. If suddenly, blockchain node B stops to receive transactions (or blocks) from blockchain node A but other blockchain nodes, Blockchain node B waits for a time duration. If the situation keeps the same, blockchain node B may determine blockchain node A is offline. If blockchain node B starts to receive any transactions/blocks from any other blockchain nodes for a sufficiently long time, blockchain node B may regard itself as an offline node.

In yet another implementation, a blockchain client helps to detect offline blockchain nodes. When a blockchain client fails in interacting with its current blockchain node such as blockchain node A, it may choose a new blockchain node B. Then, the blockchain client may inform blockchain node B that it cannot reach blockchain node A anymore. Blockchain node B may contact blockchain node A to confirm its status. If blockchain node B also cannot reach blockchain node A, it may label blockchain node A as an offline node.

After blockchain node B detects blockchain node A is offline. It may take the following actions:

Blockchain node B may generate an offline node notification message including the identifier/address of blockchain node A. If blockchain node B knows the reason (e.g., suddenly offline, offline as scheduled, etc.) for blockchain node A to go offline, it may include the reason in the message too. Blockchain node B may send the message to all its neighbors. The message may be forwarded by neighbors so that all online blockchain nodes become aware of the offline status of blockchain node A.

Blockchain node B may generate a special transaction including the identifier/address of blockchain node A and the reason that blockchain node A goes offline. Blockchain node B broadcasts this special transaction within the blockchain system. This special transaction may be received by all online blockchain nodes, which will verify it. The majority vote may be used for the verification. For example, after receiving this special transaction, a blockchain node C as the neighbor of blockchain node A actively sends a hello message to blockchain node A to check and confirm its status. Blockchain node C may report the status of blockchain node A to the blockchain system. Other online blockchain node may do the same as blockchain node C. Eventually, the majority rule may be used to determine the status (i.e., online or offline) of blockchain node A. If more blockchain nodes confirm blockchain node goes offline, the final status of blockchain node A is offline. Otherwise, the final status of blockchain node A is recorded as online if more blockchain nodes confirm blockchain node A is still reachable, although blockchain node B reported blockchain node A was offline. At the last, an online blockchain node (the one that wins the consensus protocol) may record the majority voting result (i.e., the final status of blockchain node A) onto the blockchain, and every other online blockchain node agrees with this recording. This way may prevent a malicious node from wrongly reporting the status of a blockchain node.

If blockchain node B detects itself offline or decides to use its own offline schedule to go offline, it may contact the BMF to indicate its offline schedules and/or check if the BMF may assign a proxy node for it. If there is no the BMF or no any assigned proxy node, blockchain node B, after it wakes up, may stay silent for a time duration waiting for any incoming transactions/blocks/messages from other blockchain nodes, and may retry to contact its previous neighbors periodically until it is able to connect with one of its neighbors. With such information from offline blockchain node detection, the BMF may know the latest status of all blockchain nodes and may perform a more efficient blockchain offline operations management and blockchain synchronization.

Blockchain node B may add more other blockchain nodes as its new neighbors. Blockchain node B may not immediately start to forward transactions/blocks through these new neighbors to avoid increasing communication overhead, but blockchain node B may use these new neighbors as backups. In other words, when more old neighbors become unavailable or unreachable, blockchain node B may start to instruct new neighbors to forward (and/or receive) transactions/blocks through (and/or from) them.

Figure 14:
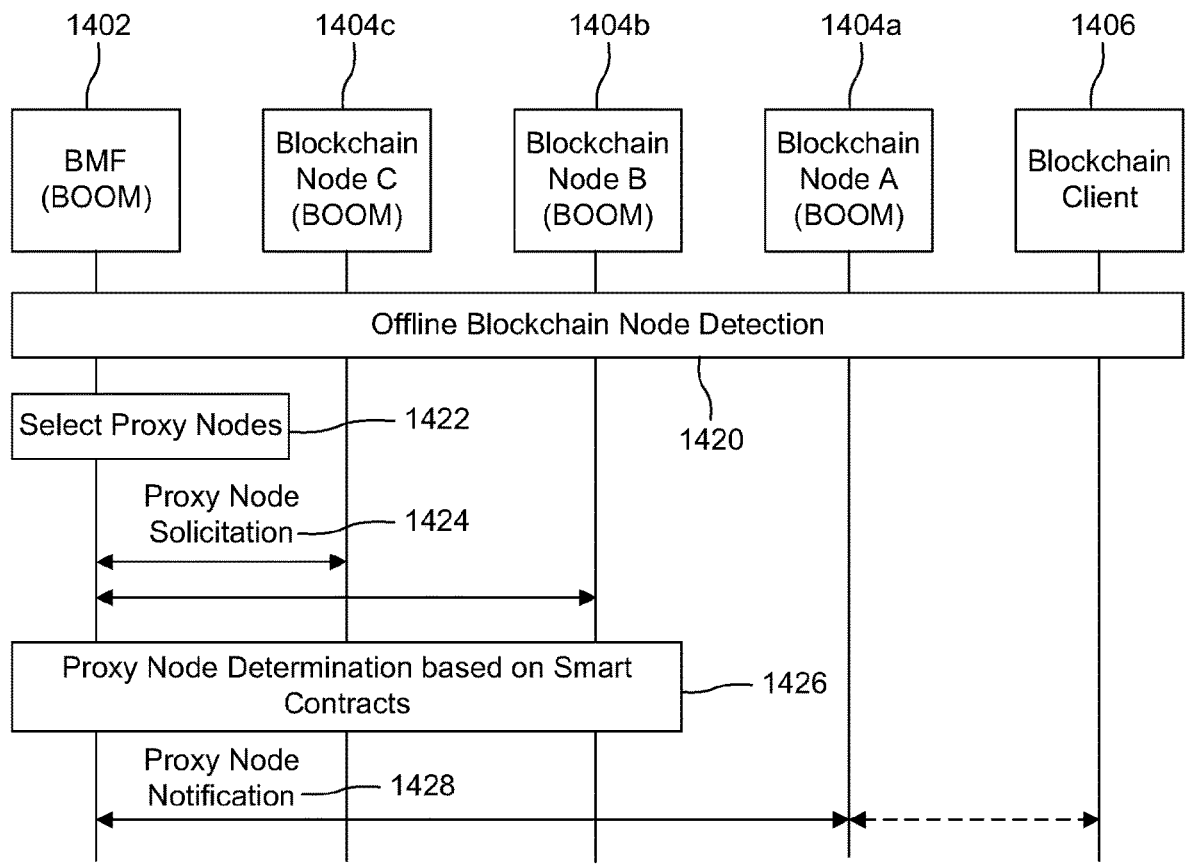
FIG. 14 illustrates exemplary procedures for determining proxy nodes for an offline blockchain node.

FIG. 14 illustrates exemplary procedures for determining proxy nodes for an offline blockchain node. In this scenario, it is assumed that: (1) blockchain client 1406 is associated with or interacts with blockchain node A 1404a and (2) blockchain node A 1404a is currently offline or may be going offline.

At 1420, the methods for detecting offline blockchain node as described above are applied. Assume blockchain node A 1404a is detected as an offline blockchain node or it may be going offline. Here, blockchain node A 1404a itself may indicate its preferred proxy nodes (e.g., blockchain node B 1404b and/or blockchain node C 1404c and/or other blockchain node with certain specific blockchain capabilities). Blockchain node B 1404b (and/or blockchain node C 1404c) may indicate that it is willing to be a proxy node for blockchain node A 1404a or it is willing to be a proxy node for other blockchain nodes with certain specific blockchain capabilities. Blockchain client 1406 may indicate its preferences on proxy nodes for blockchain node A 1404a (e.g., online blockchain nodes closer to blockchain client may be preferred by blockchain client).

At 1422, assume blockchain node A 1404a is detected offline or it may be offline. Then, the BMF 1402 may select proxy nodes for blockchain node A 1404a, according to information derived at 1420 or some pre-configured proxy node selection rules. For example, if blockchain node A 1404a has indicated blockchain node B 1404b as its preferred proxy node at 1420, the BMF 1402 may simply select blockchain node B 1404b to be the proxy node for blockchain node A 1404a. In another example, if blockchain node A's clients has indicated at 1420 that blockchain node C 1404c is the preferred proxy node when blockchain node A 1404a is offline, the BMF 1402 may choose blockchain node C 1404c as the proxy node of blockchain node B 1404b. In another example, the BMF 1402 may select proxy nodes based on blockchain capability of online blockchain nodes. For example, the BMF 1402 may select blockchain node B 1404b (or blockchain node C 1404c) as the proxy node for blockchain node A 1404a if blockchain node B 1404b (or blockchain node C 1404a) is closer to blockchain node A 1404a), in order to reduce blockchain synchronization overhead after blockchain node A 1404a wakes up.

At 1424, as an alternative to the process described at 1422, the BMF 1402 may send a proxy node solicitation request to some or all presently online blockchain nodes (e.g., blockchain node B 1404b and/or blockchain node C 1404c) to check their willingness of being a proxy node for blockchain node A 1404a. This request may include the address/identifier of blockchain node A 1404a, the time duration to be the proxy node for blockchain node A 1404a, the number of blockchain clients that may migrate from blockchain node A 1404a, the required functions as a proxy node (e.g., support blockchain clients, endorse/validate transactions, participate the consensus protocol and generate new blocks, etc.).

Then, blockchain node B 1404b (and/or blockchain node C 1404c) may send a proxy node solicitation response to the BMF 1402. This response indicates if blockchain node B 1404b (or blockchain node C 1404c) is willing to be a proxy node for blockchain node A 1404a. This response may include the address/identifier of blockchain node B 1404b (or blockchain node C 1404c), the reason for rejecting to be a proxy node, etc. Finally, the BMF 1402 may send a proxy node solicitation confirmation to blockchain B 1404b (and/or blockchain node C 1404c) if the BMF 1402 determines blockchain node B 1404b (and/or blockchain node C 1404c) to be the proxy node for blockchain node A 1404a.

At 1426, as an alternative to the processes described at 1422 or 1424, the BMF 1402 and online blockchain nodes (e.g., blockchain node B 1404b and blockchain node C 1404c) may use smart contract to select one or multiple proxy nodes in an autonomous and decentralized approach. For example, the BMF 1402 may first generate a proxy-node-selection smart contract and broadcast it through the blockchain system. Alternatively, blockchain node A 1404a may generate a proxy-node-selection smart contract and broadcast it through the blockchain system before it goes offline. The proxy-node-selection smart contract may include the address/identifier of blockchain node A 1404a, the cost the blockchain node A 1404a would like to pay to the selected proxy node, the number of proxy nodes that blockchain node A 1404a may need, the time duration requested for proxying, the required blockchain capabilities for being a proxy node, etc. All online blockchain node may receive the proxy-node-selection smart contract. If an online blockchain node (e.g., blockchain node B 1404b and/or blockchain node C 1404c) is willing to be the proxy node of blockchain node A 1404a, it runs the smart contract and participates the consensus protocol. If it wins the consensus protocol, it generates a new transaction including the execution result of the proxy-node-selection smart contact and broadcasts it through the blockchain system. This blockchain node (blockchain node B 1404b and/or blockchain node C 1404c) that wins the consensus protocol may be automatically selected as the proxy node for blockchain node A 1404a. Blockchain node A may know the selected proxy node for it and thus the process described at 1428 may not be needed.

At 1428, the proxy node(s) for blockchain node A 1404a has been determined and are known to the BMF 1402. the BMF 1402 may send a proxy node notification to blockchain node A 1404a. This request may include the address/identifier of determined proxy node(s), the time duration for the proxying, etc. Blockchain node A 1404*a* receives this notification and sends an acknowledgement to the BMF 1402. Blockchain node A 1404*a* may forward this notification to blockchain client to instruct blockchain client to interact with the determined proxy node when blockchain node A 1404*a* goes offline. the BMF 1402 may select itself as the proxy node for blockchain node A 1404*a*.

When a smart contract is executed, it usually needs to get some input data from an external entity (i.e. an oracle) in order to complete the execution of the smart contract. If the oracle gets offline or becomes inaccessible to smart contracts, all smart contracts relying on this oracle may be impacted and cannot be successfully executed. In order to solve this issue, two methods are proposed.

Figure 15:
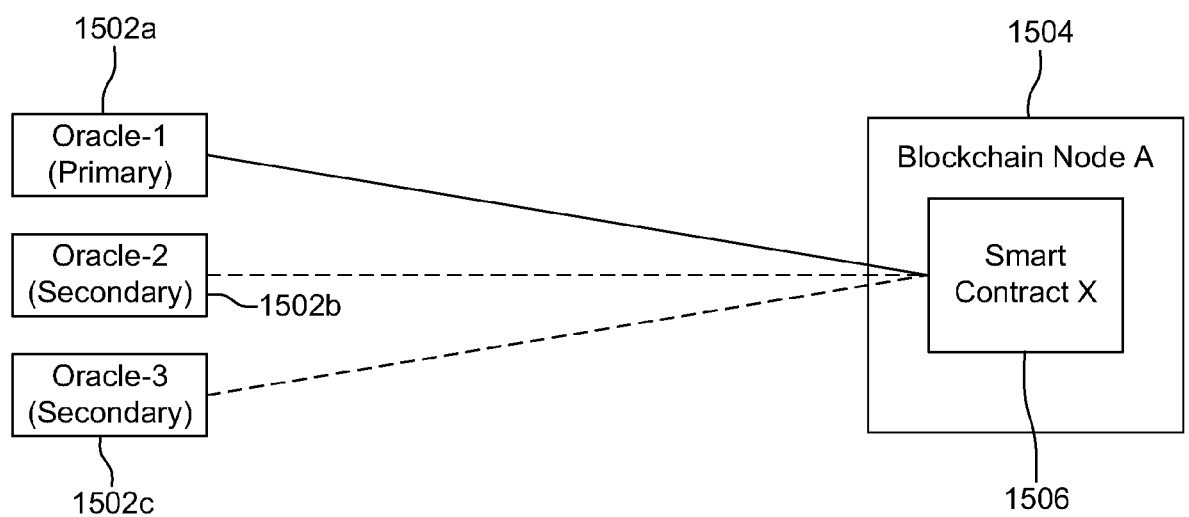
FIG. 15 illustrates multiple oracles.

As illustrated in FIG. 15, multiple oracles (e.g., Oracle-1 1502*a*, Oracle-2 1502*b*, Oracle-3 1502*c*) may be used. One oracle is deployed as a primary oracle (e.g., Oracle-1 1502*a*) and others may be secondary oracles (e.g., Oracle-2 1502*b* and Oracle-3 1502*c*) as backups for the primary oracle 1502*a*. These multiple oracles provide the same set of input data. When smart contract X is created and stored onto the blockchain system (e.g., at blockchain node A 1504), the addresses and/or access details of all these oracles (e.g., Oracle-1 1502, Oracle-2 1502*b*, Oracle-3 1502*c*) may be included in smart contract X. Alternatively, blockchain node A 1504 may insert addresses and/or access details of additional oracles into smart contract X, when it wins the consensus protocols and starts to add smart contract X 1506 into a new block.

In one example, Oracle-1 1502*a*, Oracle-2 1502*b*, and Oracle-3 1502*c* are first registered with blockchain node A 1508 (or announce themselves to the entire blockchain system). Then, a blockchain client attempts to create smart contract X including the address and/or access details of Oracle-1 1502*a* by sending a transaction including smart contract X to the blockchain system. Next, blockchain node A 1504 may receive this transaction and identifies that smart contact X 1506 relies on Oracle-1. Blockchain node A 1504 may also identify that Oracle-2 1502*b* and Oracle-3 1502*c* provide similar input data as Oracle-1 1502*a* does, which implies Oracle-2 1502*b* and Oracle-3 1502*c* may be leveraged as backups when Oracle-1 1502*a* goes offline and/or becomes unreachable. Then, blockchain node A 1504 participates the consensus protocol. Blockchain node A 1504 wins the consensus protocol and alters smart contract X by adding the addresses and/or access details of Oracle-2 1502*b* and Oracle-3 1502*c* as backups for Oracle-1 1502*a*. Now, smart contract X 1506 includes addresses and/or access details of Oracle-1 1502*a*, Oracle-2 1502*b*, and Oracle-3 1502*c*. Blockchain node A 1504 may create a new block including the modified smart contract X 1506 and broadcasts the new block to other blockchain nodes. All blockchain nodes in the blockchain system receive the new block and store smart contract X 1506. When smart contract X 1506 gets triggered, blockchain node A 1504 (or other blockchain nodes) may attempt to execute smart contact X 1506 by first contacting Oracle-1 1502*a* to retrieve some input data. When there is no any response from Oracle-1 1502*a*, blockchain node A 1504 (or other blockchain nodes) may contact Oracle-2 1502*b* or Oracle-3 1502*c* or other alternative oracles to retrieve the same input data in order to successfully execute smart contact X 1506.

Figure 16:
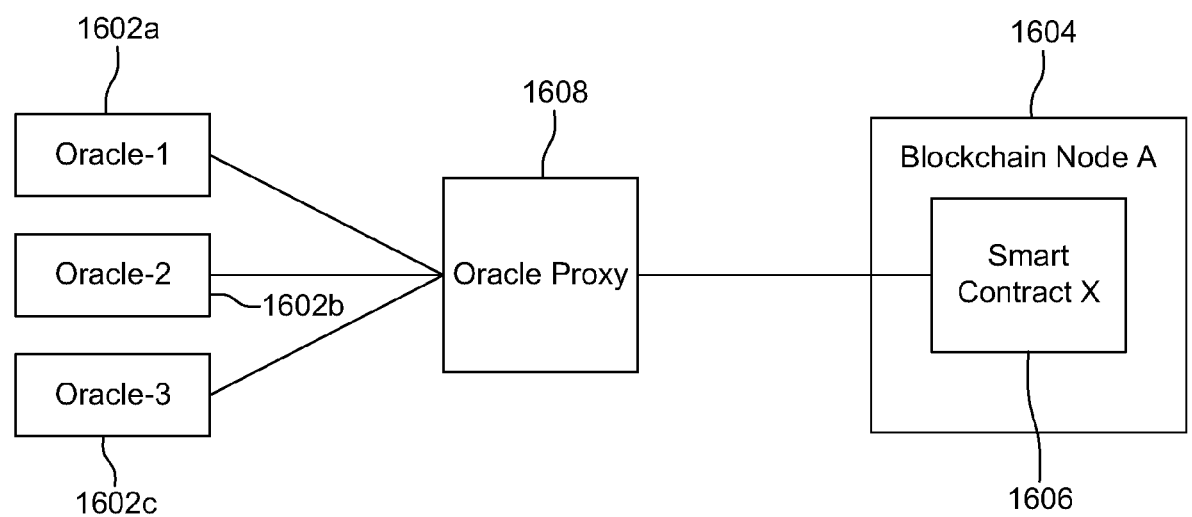
FIG. 16 illustrates an exemplary oracle proxy.

In another implementation, as illustrated in FIG. 16, an oracle proxy is proposed to interact with smart contract X 1606 on behalf of multiple original oracles (e.g., Oracle-1 1602*a*, Oracle-2 1602*b*, Oracle-3 1602*c*). Each original oracle 1602*a*, 1602*b*, and 1602*c* may be registered with the oracle proxy 1608. Alternatively, the oracle proxy 1608 may announce itself for original oracles 1602*a*, 1602*b*, and 1602*c* to delegate themselves to the oracle proxy 1608. Also, the oracle proxy 1608 may actively search for other original oracles 1602*a*, 1602*b*, and 1602*c* to provide "oracle proxying" service for them. As a result, the oracle proxy 1608 may maintain the addresses and/or access details of these original oracles 1602*a*, 1602*b*, and 1602*c*. When smart contract X 1606 is created, it may only include the address and/or access details of the oracle proxy 1602*a*, 1602*b*, and 1602*c*. When smart contract X 1606 is executed, blockchain node A 1604 (or other blockchain nodes) may contact the oracle proxy 1608 to get input data. The oracle proxy 1608 may contact Oracle-1 1602*a*, Oracle-2 1602*b*, or Oracle-3 1602*c* to retrieve requested input data and returns it to blockchain node A 1604. If Oracle-1 1602*a* goes offline, the oracle proxy 1608 may contact Oracle-2 1602*b* or Oracle-3 1602*c*. If none of maintained original oracles 1602*a*, 1602*b*, and/or 1602*c* is available, oracle proxy 1608 may search for other original oracles and retrieve requested input data from them. Alternatively, if input data provided by Oracle-1 1602*a*, Oracle-2 1602*b*, or Oracle-3 1602*c* does not change fast, oracle proxy 1608 may prefetch it from Oracle-1 1602*a*, Oracle-2 1602*b*, or Oracle-3 1602*c* and buffer the prefetch input data locally, which may be used to serve blockchain node A 1604 when blockchain node A 1604 retrieves the input data from the oracle proxy at a later time.

The proposed methods for blockchain offline operations management (e.g., off-chain BOOM, on-chain BOOM, blockchain synchronization, and offline blockchain node detection) may be deployed in 5G/6G cellular network.

Figure 17:
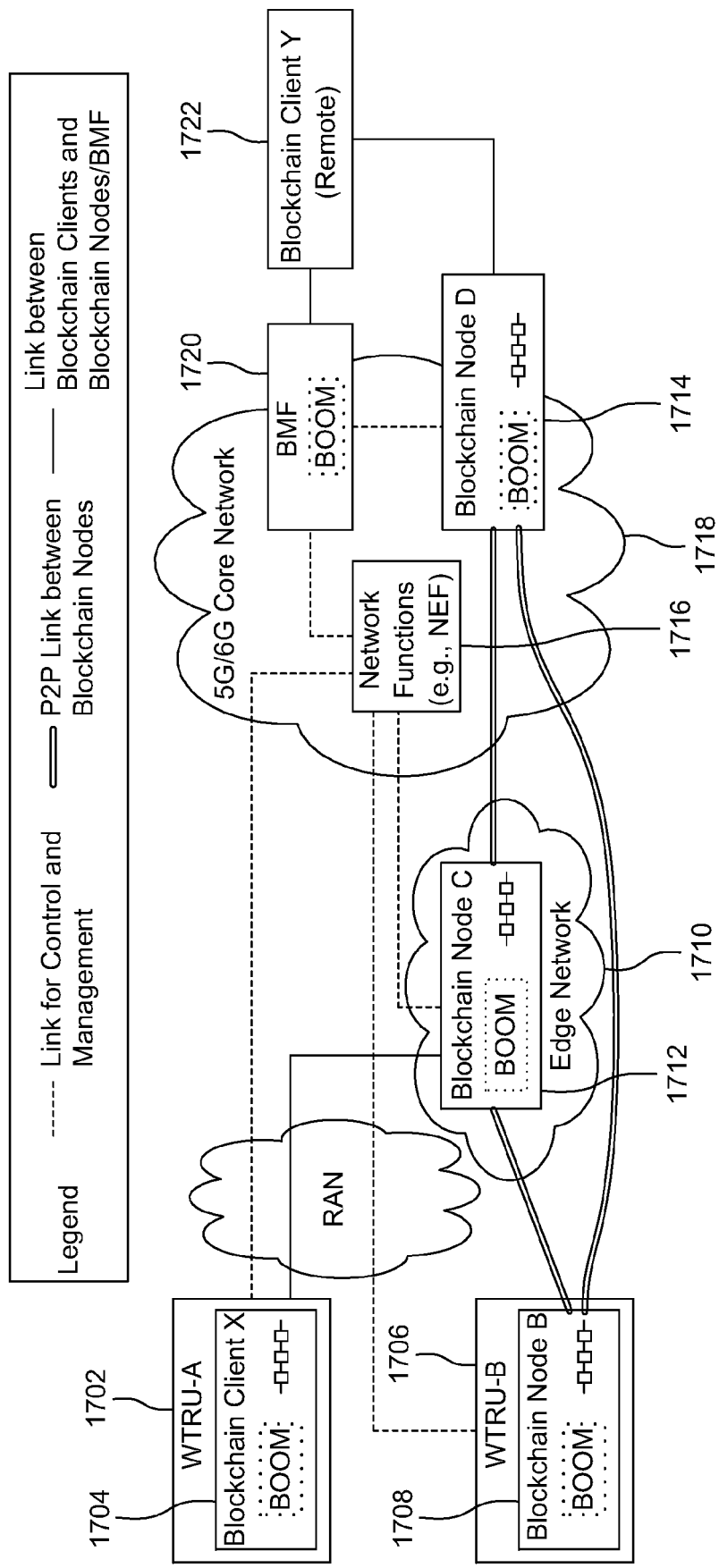
FIG. 17 illustrates an exemplary blockchain offline operation management in 5G/6G cellular networks.

FIG. 17 illustrates an example deployment, where WTRU-A 1702 such as a smartphone, hosts blockchain client X 1704, WTRU-B 1706 such as a vehicle hosts blockchain node B 1708, and blockchain node C 1712 is deployed in an edge network 1710 (e.g., hosted by an edge server). Blockchain node C 1712 may be accessed by blockchain client X 1704. It may also be accessed by 5G/6G Network Functions (NFs) 1716 such as AMF, NEF, etc.

Further, blockchain node D 1714 may be hosted in 5G/6G network 1718 or by a blockchain service provider and blockchain client Y 1722 may be a remote client, which may access blockchain directly through blockchain node D 1714 or indirectly via the BMF 1718. the BMF/BOOM 1718 may be deployed as a part of 5G/6G core network or outside of 5G/6G core network (e.g., in blockchain service provider's cloud).

All proposed procedures may be implemented through 5G/6G data plane or control plane. For example, if 5G/6G control plane is used, 5G/6G NFs 1716 may be leveraged for relaying messages between different entities, for instance, between the BMF 1720 and blockchain node C 1712, between the BMF 1720 and blockchain node B 1708, between the BMF 1720 and blockchain client X 1704, etc.

For example, assume blockchain node B 1706 is currently offline but WTRU-B 1706 may be triggerable by 5G/6G system (e.g., in offline level-3). When the BMF 1720 determines to wake up blockchain node B 1708 earlier than previously-decided offline duration, the BMF 1720 may leverage and adapt 5G/6G application triggering service to wake up blockchain node B 1708 in WTRU-B 1706. Specifically, the BMF 1720 sends a blockchain wake-up request to a 5G/6G NF 1706 (e.g., NEF), which may relay the message to WTRU-B via 5G/6G device triggering signaling. After WTRU-B 1706 receives device triggering signaling from NF 1716, it decodes the blockchain wake-up request and in turn wakes up blockchain node B 1708 hosted on it. On the other hand, when blockchain node B 1708 wakes up according to the previously-determined offline schedule, it generates a notification message indicating its online status. WTRU-B 1706 sends the notification message via 5G/6G uplink signaling to 5G/6G NFs 1706, which may forward the notification message to the BMF 1718.

In another example, blockchain client X's 1704 context information is about or related to WTRU-A's 1702 context information, the BMF 1720 may obtain WTRU-A's 1702 context information from 5G/6G NFs 1716 and deduce the context information of blockchain client X 1704.

In another example, the BMF 1720 may also leverage 5G/6G NFs 1716 to obtain WTRU-B's 1706 context information and in turn deduce/obtain blockchain capability and status information of blockchain node B 1708. In addition, when blockchain node B 1708 reports its blockchain capability and status information to the BMF 1720, it may leverage 5G/6G control plane and 5G/6G NFs 1716 to relay the information to the BMF 1720.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method performed by a first blockchain node, the method comprising:
    transmitting, to a blockchain management function (BMF), a first message including:
        a value indicating a scheduled time at which the first blockchain node will transition to offline status; and
        information indicating capabilities of the first blockchain node;
    receiving, from the BMF, a second message indicating a blockchain proxy node selected as a proxy node for the first blockchain node; and
    transitioning to the offline status at the scheduled time.

2. The method of claim 1, wherein the first blockchain node is a wireless transmit/receive unit (WTRU).

3. The method of claim 1, wherein the first blockchain nodes sends the first message to the BMF.

4. The method of claim 1, wherein the first message indicates a preferred proxy node of the first blockchain node.

5. The method of claim 1, wherein a blockchain client indicates a preferred proxy node of the first blockchain node.

6. The method of claim 1, wherein the BMF selects proxy nodes based on a capability of at least one node, or the time at which the first blockchain node will change status to offline.

7. The method of claim 1, wherein the BMF includes a Blockchain Offline Operation Management (BOOM) as a logical function to manage offline operations of blockchain nodes.

8. A first blockchain node comprising:
    a receiver;
    a transmitter; and
    a processor;
    wherein the transmitter is configured to transmit, to a blockchain management function (BMF), a first message that includes including:
        a value indicating a scheduled time at which the first blockchain node will transition to offline status; and
        information indicating capabilities of the first blockchain node;
    wherein the receiver is configured to receive, from the BMF, a second message a blockchain proxy node selected as a proxy node for the first blockchain node; and
    wherein the processor is configured transition to the offline status at the scheduled.

9. The first blockchain node of claim 8, wherein the first blockchain node is a wireless transmit/receive unit (WTRU).

10. The first blockchain node of claim 8, wherein the transmitter is further configured to send the first message to the BMF.

11. The first blockchain node of claim 8, wherein the first message indicates a preferred proxy node of the first blockchain node.

12. The first blockchain node of claim 8, wherein a blockchain client indicates a preferred proxy node of the first blockchain node.

13. The first blockchain node of claim 8, wherein the BMF selects proxy nodes based on a capability of at least one node, or the time at which the first blockchain node will change status to offline.

14. The first blockchain node of claim 8, wherein the BMF includes a Blockchain Offline Operation Management (BOOM) as a logical function to manage offline operations of blockchain nodes.

15. A method performed by a first blockchain node, the method comprising:
    transmitting, to a second blockchain node, a first message requesting a status of the second blockchain node;
    receiving, from the second blockchain node, a second message a value that indicates a time at which the second blockchain node will change status to offline; and
    transmitting, to a third blockchain node, a third message that includes the status of the first blockchain node, the status of the second blockchain node, and the time at which the second blockchain node will change status to offline.

\* \* \* \* \*